(12) United States Patent
Matsuda et al.

(10) Patent No.: US 12,250,072 B2
(45) Date of Patent: Mar. 11, 2025

(54) INFORMATION PROCESSING DEVICE, COMMUNICATION SYSTEM, AND INFORMATION PROCESSING METHOD TO INCREASE FREQUENCY UTILIZATION EFFICIENCY

(71) Applicant: SONY GROUP CORPORATION, Tokyo (JP)

(72) Inventors: Hiroki Matsuda, Tokyo (JP); Ren Sugai, Tokyo (JP); Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 74 days.

(21) Appl. No.: 17/998,669

(22) PCT Filed: May 19, 2021

(86) PCT No.: PCT/JP2021/018921
§ 371 (c)(1),
(2) Date: Nov. 13, 2022

(87) PCT Pub. No.: WO2021/241345
PCT Pub. Date: Dec. 2, 2021

(65) Prior Publication Data
US 2023/0198664 A1 Jun. 22, 2023

(30) Foreign Application Priority Data
May 27, 2020 (JP) ................................. 2020-092718

(51) Int. Cl.
*H04L 1/00* (2006.01)
*G06F 3/00* (2006.01)
*H04L 1/06* (2006.01)

(52) U.S. Cl.
CPC .......... *H04L 1/0057* (2013.01); *H04L 1/0041* (2013.01)

(58) Field of Classification Search
CPC ... H04L 1/0057; H04L 1/0041; H04L 1/0009; H04L 1/0014; H04L 1/0018; H04L 1/004; H04L 1/06; H04L 1/22; H04L 69/14
See application file for complete search history.

(56) References Cited

U.S. PATENT DOCUMENTS 7,676,591 B2 * 3/2010 Chan ................ H04N 21/23439
375/240
10,742,365 B2 * 8/2020 Hayashi ................ H04L 1/1874
(Continued)

FOREIGN PATENT DOCUMENTS

JP 2007-503740 A 2/2007
JP 2013-521695 A 6/2013
(Continued)

OTHER PUBLICATIONS

"Multiplexing and channel coding", 3rd Generation Partnership Project, Technical Specification Group Radio Access Network, 3GPP TS 38.212 V15.7.0, Release 15, Sep. 2019, 101 pages.
(Continued)

*Primary Examiner* — Justin R Knapp
(74) *Attorney, Agent, or Firm* — CHIP LAW GROUP

(57) ABSTRACT

An information processing device includes an encoding processing unit and a determination unit. The encoding processing unit performs error correction encoding processing in which a plurality of bit sequences are output from one or more bit sequences. The determination unit divides the plurality of bit sequences into a first bit sequence group (BS1) and a second bit sequence group (BS2), and determines to transmit the first bit sequence group (BS1) and the second bit sequence group (BS2) through different propagation paths, the first bit sequence group (BS1) being
(Continued)

decodable without performing error correction decoding processing corresponding to the error correction encoding processing, and the second bit sequence group (BS2) being used for the error correction decoding processing.

15 Claims, 15 Drawing Sheets

(56) References Cited

U.S. PATENT DOCUMENTS

| | | | |
|---|---|---|---|
| 10,771,189 B2* | 9/2020 | Das Sharma | H04L 1/0041 |
| 11,240,812 B2* | 2/2022 | Wang | H04L 1/00 |
| 2009/0201803 A1* | 8/2009 | Filsfils | H04L 45/28 |
| | | | 370/222 |
| 2009/0201805 A1* | 8/2009 | Begen | H04L 1/0018 |
| | | | 370/225 |
| 2023/0188253 A1* | 6/2023 | Matsuda | H04L 1/0041 |
| | | | 370/328 |

FOREIGN PATENT DOCUMENTS

| | | |
|---|---|---|
| JP | 2016-163139 A | 9/2016 |
| JP | 2017-502595 A | 1/2017 |

OTHER PUBLICATIONS

International Search Report and Written Opinion of PCT Application No. PCT/JP2021/018921, issued on Jul. 20, 2021, 10 pages of ISRWO.

* cited by examiner

INFORMATION PROCESSING DEVICE, COMMUNICATION SYSTEM, AND INFORMATION PROCESSING METHOD TO INCREASE FREQUENCY UTILIZATION EFFICIENCY

CROSS REFERENCE TO RELATED APPLICATIONS

This application is a U.S. National Phase of International Patent Application No. PCT/JP2021/018921 filed on May 19, 2021, which claims priority benefit of Japanese Patent Application No. JP 2020-092718 filed in the Japan Patent Office on May 27, 2020. Each of the above-referenced applications is hereby incorporated herein by reference in its entirety.

FIELD

The present disclosure relates to an information processing device, a communication system, and an information processing method.

BACKGROUND

Wireless access schemes and wireless networks for cellular mobile communication (hereinafter, also referred to as "long term evolution (LTE)", "LTE-advanced (LTE-A)", "LTE-advanced Pro (LTE-A Pro)", "new radio (NR)", "new radio access technology (NRAT)", "evolved universal terrestrial radio access (EUTRA)", or "further EUTRA (FEUTRA)") have been studied in the 3rd generation partnership project (3GPP). Note that, in the following description, LTE includes LTE-A, LTE-A Pro, and EUTRA, and NR includes NRAT and FEUTRA. In LTE and NR, a base station device (base station) is also referred to as an evolved NodeB (eNodeB), and a terminal device (mobile station, mobile station device, and terminal) is also referred to as user equipment (UE). LTE and NR are cellular communication systems in which a plurality of areas covered by base station devices are arranged in cell type. A single base station device may manage a plurality of cells.

NR, which is a next-generation radio access scheme for LTE, is a radio access technology (RAT) different from LTE. NR is an access technology that can deal with various use cases including enhanced mobile broadband (eMBB), massive machine type communications (mMTC), and reliable and low latency communications (URLLC). NR is studied aiming at a technical framework corresponding to application scenarios, requirement conditions, arrangement scenarios, and the like in those use cases.

NR requires highly reliable and low-delay communication. In order to satisfy such requirements, error correction coding has been studied for NR. Non Patent Literature 1 discloses a technology related to error correction coding studied for NR.

CITATION LIST

Non Patent Literature

Non Patent Literature 1: 3GPP TS 38.212 V15.7.0 (2019-09), "Multiplexing and channel coding (Release 15)"

SUMMARY

Technical Problem

However, when error correction capability is increased to realize more highly reliable error correction coding, a bit sequence to be transmitted tends to be longer. The increase in length of the bit sequence to be transmitted causes an increase in amount of information to be transmitted, resulting in a decrease in frequency utilization efficiency.

Therefore, the present disclosure proposes an information processing device, a communication system, and an information processing method capable of suppressing a decrease in frequency utilization efficiency.

Solution to Problem

According to the present disclosure, an information processing apparatus is provided. The information processing device includes an encoding processing unit and a determination unit. The encoding processing unit performs error correction encoding processing in which a plurality of bit sequences are output from one or more bit sequences. The determination unit divides the plurality of bit sequences into a first bit sequence group and a second bit sequence group, and determines to transmit the first bit sequence group and the second bit sequence group through different propagation paths, the first bit sequence group being decodable without performing error correction decoding processing corresponding to the error correction encoding processing, and the second bit sequence group being used for the error correction decoding processing.

DESCRIPTION OF EMBODIMENTS

Figure 1:
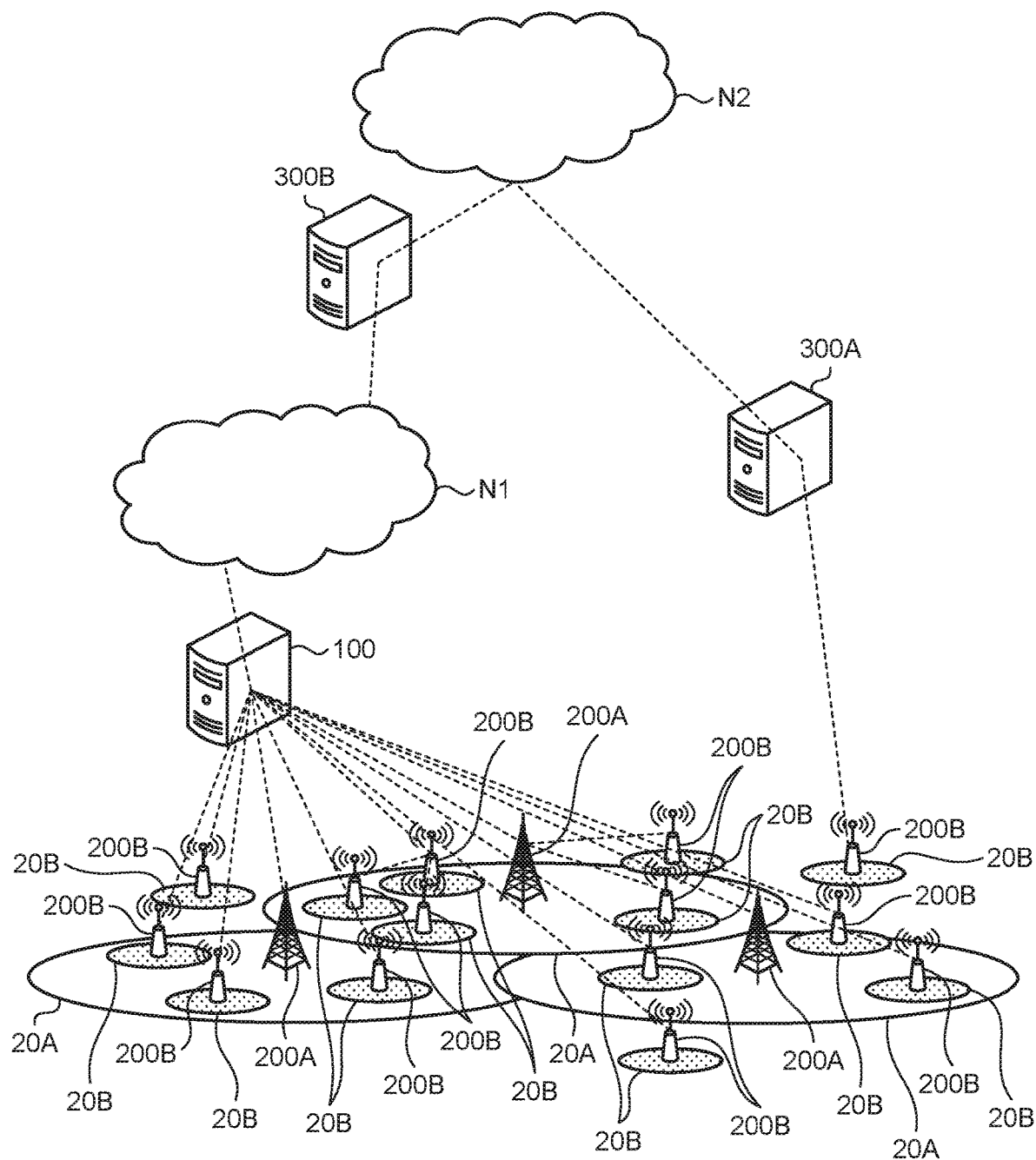
FIG. 1 is an explanatory diagram for explaining an example of a schematic configuration of a network including a system according to an embodiment of the present disclosure.

Hereinafter, preferred embodiments of the present disclosure will be described in detail with reference to the accompanying drawings. Note that, in the present specification and the drawings, components having substantially the same functional configurations are denoted by the same reference signs, and the description thereof will not be repeated.

In addition, in the present specification and the drawings, similar components between the embodiments may be distinguished from each other by attaching different alphabets to the same reference numerals. However, in a case where it is not necessary to particularly distinguish the similar components from each other, only the same reference numeral is attached to the similar components.

Note that the description will be given in the following order.

1. Example of Configuration
1.1. Example of Network Configuration
1.2. Example of Configuration of Base Station Device
1.3. Example of Configuration of Terminal Device
2. Error Correction Coding
2.1. First FEC
2.2. Second FEC
2.3. FEC Processing
3. Technical Feature
4. Communication Processing
4.1. Downlink Communication Processing 1
4.2. Downlink Communication Processing 2
4.3. Uplink Communication Processing
4.4. Sidelink Communication Processing
5. Supplement

1. Example of Configuration

<1.1. Example of Network Configuration>

First, an example of a schematic configuration of a network including a system according to an embodiment of the present disclosure will be described with reference to FIG. 1. FIG. 1 is an explanatory diagram for explaining an example of a schematic configuration of a network including a system according to an embodiment of the present disclosure.

A system according to an embodiment of the present disclosure includes a base station device 200 and a terminal device 400 (not illustrated). A base station device 200A illustrated in FIG. 1 is a macro cell base station device, and provides a service to the terminal device 400 using a cell 20A as a communication area. Note that the cell 20A is a macro cell.

On the other hand, a base station device 200B is a small cell base station device, and provides a service to the terminal device 400 using a cell 20B as a communication area. Note that the cell 20B is a small cell.

The cell 20A may be operated according to any wireless communication scheme such as LTE, LTE-Advanced (LTE-A), LTE-ADVANCED PRO, GSM (registered trademark), UMTS, W-CDMA, CDMA2000, WiMAX, WiMAX2, or IEEE802.16.

Note that the small cell is a concept that can include various types of cells (e.g., femtocell, nanocell, picocell, or microcell) smaller than the macro cell, while being arranged to overlap with the macro cell or not to overlap with the macro cell. In one example, the small cell is operated by a dedicated base station device. In another example, the small cell is operated by a terminal serving as a master device temporarily operating as a small cell base station device. A so-called relay node can also be considered to be a type of small cell base station device. A wireless communication device functioning as a master station of the relay node is also referred to as a donor base station device. The donor base station device may refer to a DeNB in LTE, and more generally, may refer to a master station of the relay node.

Note that one base station device 200 may provide a plurality of cells 20.

In addition, a plurality of base station devices 200B may form one group (cluster). In this case, a role as a cluster head may be assigned to one of the plurality of base station devices 200B included in the cluster.

The base station devices 200 can communicate with each other via a backhaul, and mainly exchange control information. The backhaul may be wired or wireless. In the backhaul, exchange can be performed, for example, using a protocol of an X2 interface or an S1 interface.

The base station device 200 also has a backhaul with a core network N1. In this case, the base station device 200 may be connected to the core network N1 via a control entity 100. Note that the control entity 100 may be an entity of the core network N1.

Alternatively, the base station device 200 may be connected to the core network N1 via an external network N2. Examples of such a base station device 200 include a femto cell base station device and a home eNodeB (HeNB) device that can be installed indoors or at home. In this case, the base station device 200 is connected to the external network N2 via a gateway device 300A. The gateway device 300A is a gateway device for HeNB. The external network N2 is connected to the core network N1 via a gateway device 300B. Therefore, the base station device 200 can be connected to the core network N1 via the external network N2 as well.

Note that the base station device 200A and the base station device 200B may use the same radio resource in the cell 20A and the cell 20B, respectively. For example, the cells 20A and 20B may use the same frequency resource F1, or may use the same time resource T1. When the base station devices 200 use the same radio resource as described above, it is possible to improve efficiency in utilizing the radio resource from the point of view of the entire system.

Alternatively, the base station device 200A and the base station device 200B may use different radio resources in the cell 20A and the cell 20B, respectively. For example, the base station device 200A may use a frequency resource F1 in the cell 20A, and the base station device 200B may use a frequency resource F2 in the cell 20B. Alternatively, the base station device 200A may use a time resource T1 in the cell 20A, and the base station device 200B may use a time resource T2 in the cell 20B. When the base station device 200A and the base station device 200B use different radio resources as described above, it is possible to avoid interference between the cell 20A and the cell 20B.

Alternatively, the base station device 200A and the base station device 200B may use different radio resources in the cell 20A and the cell 20B, respectively. The base station device 200A and the base station device 200B may perform communication, each using both the frequency resources F1 and F2. Alternatively, the base station device 200A and the base station device 200B may perform communication, each using both the time resources T1 and T2. In particular, in a case where the base station device 200 uses the frequency resources F1 and F2, this is equivalent to carrier aggregation (CA).

Note that lines connecting the devices to each other, which are indicated as broken lines in FIG. 1, indicate logical connections, regardless of whether or not the devices are physically connected to each other in a direct manner.

<1.2. Example of Configuration of Base Station Device>

The base station device 200 is a wireless communication device that operates a cell and wirelessly communicates with the terminal device 400. The base station device 200 is a type of information processing device (communication device). A plurality of base station devices 200 may be connected to each other. One or more base station devices 200 may be included in a radio access network (RAN). That is, the base station device 200 may be simply referred to as a RAN, a RAN node, an access network (AN), or an AN node. When a CN to be connected is an EPC, a corresponding RAN is referred to as an enhanced universal terrestrial RAN (EUTRAN). When a CN to be connected is a 5GC, a corresponding RAN is referred to as an NGRAN. A RAN in W-CDMA (UMTS) is referred to as a UTRAN. An LTE base station is referred to as an evolved node B (eNodeB) or an eNB. That is, the EUTRAN includes one or more eNodeBs (eNBs). In addition, an NR base station is referred to as a gNodeB or a gNB. That is, the NGRAN includes one or more gNBs. Further, the EUTRAN may include a gNB (en-gNB) connected to the core network (EPC) in an LTE communication system (EPS). Similarly, the NGRAN may include an ng-eNB connected to the core network 5GC in a 5G communication system (5GS). Additionally or alternatively, in a case where the base station is an eNB, a gNB, or the like, the base station device 200 may be referred to as a 3GPP access. Additionally or alternatively, in a case where the base station is a radio access point, the base station device 200 may be referred to as a non-3GPP access. Additionally or alternatively, the base station device 200 may be an optical extension device called a remote radio head (RRH) or a remote radio unit (RRU). Additionally or alternatively, in a case where the base station is a gNB, the base station device 200 may be referred to as any one or a combination of the gNB central unit (CU) and the gNB distributed unit (DU) described above. The gNB central unit (CU) hosts a plurality of upper layers (e.g., RRC, SDAP, and PDCP) among access strata for communication with the terminal device 400. On the other hand, the gNB-DU hosts a plurality of lower layers (e.g., RLC, MAC, and PHY) among access strata. That is, among messages/information transmitted from the base station device 200, RRC signalling (quasi-static notifications) may be generated by the gNB CU, while DCI (dynamic notifications) may be generated by the gNB-DU. Alternatively, among RRC configurations (quasi-static notifications), some configurations such as IE:cellGroupConfig may be generated by the gNB-DU, and the other configurations may be generated by the gNB-CU. These configurations may be transmitted and received through an F1 interface. The base station device 200 may be configured to be able to communicate with other base station devices 200. For example, in a case where the plurality of base station devices 200 are eNBs or a combination of eNBs and en-gNBs, the base station devices 200 may be connected to each other by the X2 interface. Additionally or alternatively, in a case where the plurality of base stations are gNBs or a combination of gn-eNBs and gNBs, the base station devices may be connected to each other by an Xn interface. Additionally or alternatively, in a case where the plurality of base station devices 200 is a combination of gNB central units (CUs) and gNB distributed units (DUs), the base station devices may be connected to each other by the above-described F1 interface. The messages/information transmitted from the base station devices 200 may be communicated between the plurality of base stations (for example, via the X2, Xn, or F1 interface). Furthermore, the base station devices 200 may be integrated access and backhaul (IAB) donor nodes or IAB relay nodes that provide radio access lines and radio backhaul lines by time division multiplexing, frequency division multiplexing, or space division multiplexing.

Cells provided by the base station devices 200 are referred to as serving cells. The serving cells include primary cells (PCells) and secondary cells (SCells). In a case where dual connectivity (e.g., EUTRA-EUTRA dual connectivity, EUTRA-NR dual connectivity (ENDC), EUTRA-NR dual connectivity with 5GC, NR-EUTRA dual connectivity (NEDC), or NR-NR dual connectivity) is provided to the terminal device 400, a PCell and 0 or one or more SCell(s) provided by a master node (MN) are referred to as a master cell group. Further, the serving cells may include PSCells (primary secondary cells or primary SCG cells). That is, in a case where dual connectivity is provided to the terminal device 400, a PSCell and 0 or one or more SCell(s) provided by a secondary node (SN) are referred to as a secondary cell group (SCG). Unless specially configured (e.g., PUCCH on SCell), a physical uplink control channel (PUCCH) is transmitted in the PCell and the PSCell, but is not transmitted in the SCell. In addition, a radio link failure is also detected in the PCell and the PSCell, but is not detected (does not need to be detected) in the SCell. Since the PCell and the PSCell have special roles among the serving cell(s), they are also referred to as special cells (SpCells). One cell may be associated with one downlink component carrier and one uplink component carrier. In addition, a system bandwidth corresponding to one cell may be divided into a plurality of bandwidth parts. In this case, one or more bandwidth parts may be configured in UE, and one bandwidth part may be used as an active BWP for the terminal device 400. In addition, radio resources (e.g., frequency band, numerology (subcarrier spacing), and slot format (slot configuration)) that can be used by the terminal device 400 may be different for each cell, each component carrier, or each BWP. The beam described above may be uniquely identified within one cell or one BWP.

Note that the base station devices 200 may be able to communicate with each other via a base station device-core network interface (e.g., an S1 interface, an NG Interface, or the like). This interface may be wired or wireless.

The base station devices 200 can be used, operated, and/or managed by various entities. Examples of entities may include a mobile network operator (MNO), a mobile virtual network operator (MVNO), a mobile virtual network enabler (MVNE), a neutral host network (NHN) operator, an enterprise, an educational institution (a school foundation, a board of education in each local government, or the like), a real estate (a building, an apartment, or the like) manager, and an individual.

Of course, the entities that use, operate, and/or manage the base station devices 200 are not limited thereto. The base station device 200 may be installed and/or operated by one business operator, or may be installed and/or operated by one individual. Of course, the entities that use and/or operate the base station devices 200 are not limited thereto. For example, the base station device 200 may be installed and/or operated jointly by a plurality of business operators or a plurality of individuals. Furthermore, the base station device 200 may be a shared facility used by a plurality of business operators or a plurality of individuals. In this case, the equipment may be installed and/or operated by a third party other than users.

Note that the concept of the base station device (also referred to as the base station) includes not only a donor base station but also a relay base station (also referred to as a relay station or a relay station device). In addition, the concept of the base station includes not only a structure having a function of the base station but also a device installed in the structure.

For example, the structure is a building such as a skyscraper, a house, a steel tower, a station facility, an airport facility, a harbor facility, or a stadium. Note that the concept of the structure includes not only a building but also a construction (a non-building structure) such as a tunnel, a bridge, a dam, a wall, or an iron pillar, or a facility such as a crane, a gate, or a windmill. In addition, the concept of the structure includes not only a structure on land (on the ground in a narrow sense) or a structure in the ground, but also a structure on water, such as a pier or a mega float, or a structure under water, such as a marine observation facility. The base station device can be reworded as a processing device or an information processing device.

The base station device 200 may be a donor station or a relay station (relay station). Furthermore, the base station device 200 may be a fixed station or a mobile station. The mobile station is a wireless communication device (e.g., a base station device) configured to be movable. At this time, the base station device 200 may be a device installed in a mobile body, or may be a mobile body itself. For example, a relay station device having mobility can be considered to be a base station device 200 as a mobile station. In addition, a device that originally has mobility, such as a vehicle, a drone, or a smartphone, together with functions of a base station device (at least some of the functions of the base station device) also corresponds to a base station device 200 as a mobile station.

Here, the mobile body may be a mobile terminal such as a smartphone or a mobile phone. In addition, the mobile body may be a mobile body (e.g., a vehicle such as an automobile, a bicycle, a bus, a truck, a motorcycle, a train, or a linear motor car) that moves on land (on the ground in a narrow sense), or may be a mobile body (e.g., a subway) that moves in the ground (for example, in a tunnel).

In addition, the mobile body may be a mobile body (e.g., a ship such as a passenger ship, a cargo ship, or a hovercraft) that moves on water, or may be a mobile body (e.g., a submarine ship such as a submersible, a submarine, or an unmanned submarine) that moves under water.

Furthermore, the mobile body may be a mobile body (e.g., an aircraft such as an airplane, an airship, or a drone) that moves inside the atmosphere, or may be a mobile body (e.g., an artificial celestial body such as an artificial satellite, a spacecraft, a space station, or a probe) that moves outside the atmosphere. The mobile body moving outside the atmosphere can be reworded as a space mobile body.

Furthermore, the base station device 200 may be a ground base station device (a ground station device) installed on the ground. For example, the base station device 200 may be a base station device disposed in a structure on the ground, or may be a base station device installed in a mobile body moving on the ground. More specifically, the base station device 200 may be a device including an antenna installed in a structure such as a building and a signal processing device connected to the antenna. Of course, the base station device 200 may be a structure or a mobile body itself. The term "ground" means not only "on land" (on the ground in a narrow sense) but also "in the ground", "on water", and "under water" in a broad sense. Note that the base station device 200 is not limited to the ground base station device. The base station device 200 may be a non-ground base station device (non-ground station device) capable of floating in the air or space. For example, the base station device 200 may be an aircraft station device or a satellite station device.

The aircraft station device is a wireless communication device capable of floating in the atmosphere, such as an aircraft. The aircraft station device may be a device mounted on an aircraft or the like, or may be an aircraft itself. Note that the concept of the aircraft includes not only a heavy aircraft, such as an airplane or a glider, but also a light aircraft, such as a balloon or an airship. In addition, the concept of the aircraft includes a rotorcraft such as a helicopter and an autogyro as well as the heavy aircraft or the light aircraft. Note that the aircraft station device (or an aircraft on which the aircraft station device is mounted) may be an unmanned aerial vehicle such as a drone.

Note that the concept of the unmanned aerial vehicle also includes an unmanned aircraft system (UAS) or a tethered UAS. Furthermore, the concept of the unmanned aerial vehicle also includes a lighter than air (LTA) UAS and a heavier than air (HTA) UAS. Additionally, the concept of the unmanned aerial vehicle also includes a high altitude UAS platform (HAP).

The satellite station device is a wireless communication device capable of floating outside the atmosphere. The satellite station device may be a device mounted on a space mobile body such as an artificial satellite, or may be a space mobile body itself. The satellite serving as a satellite station device may be any one of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on a low earth orbiting satellite, a medium earth orbiting satellite, a geostationary earth orbiting satellite, or a highly elliptical orbiting satellite.

A coverage range (e.g., a cell) of the base station device 200 may be wide such as a macro cell or narrow such as a pico cell. Of course, the coverage range of the base station device 200 may be extremely narrow such as a femto cell. In addition, the base station device 200 may have a beamforming capability. In this case, the base station device 200 may form a cell or a service area for each beam.

In another aspect, the base station device 200 may include a set of a plurality of physical or logical devices as follows. For example, in the embodiment of the present disclosure, the base station device 200 may be divided into a plurality of devices, i.e., a baseband unit (BBU) and a radio unit (RU), and may be interpreted as a set of the plurality of devices. Additionally or alternatively, in the embodiment of the present disclosure, the base station device 200 may be either or both of a BBU and an RU. The BBU and the RU may be connected to each other by a predetermined interface (e.g., an eCPRI). Additionally or alternatively, the RU may be referred to as a remote radio unit (RRU) or a radio DoT (RD). Additionally or alternatively, the RU may correspond to the gNB-DU described above. Additionally or alternatively, the BBU may correspond to the gNB-CU described above. Additionally or alternatively, the RU may be a device integrally formed with an antenna. The antenna (e.g., the antenna integrally formed with the RU) included in the base station device 200 may adopt an advanced antenna system to support MIMO (e.g., FD-MIMO) or beamforming. In the advanced antenna system, the antenna (e.g., the antenna integrally formed with the RU) included in the base station device 200 may have, for example, 64 transmission antenna ports and 64 reception antenna ports.

Figure 2:
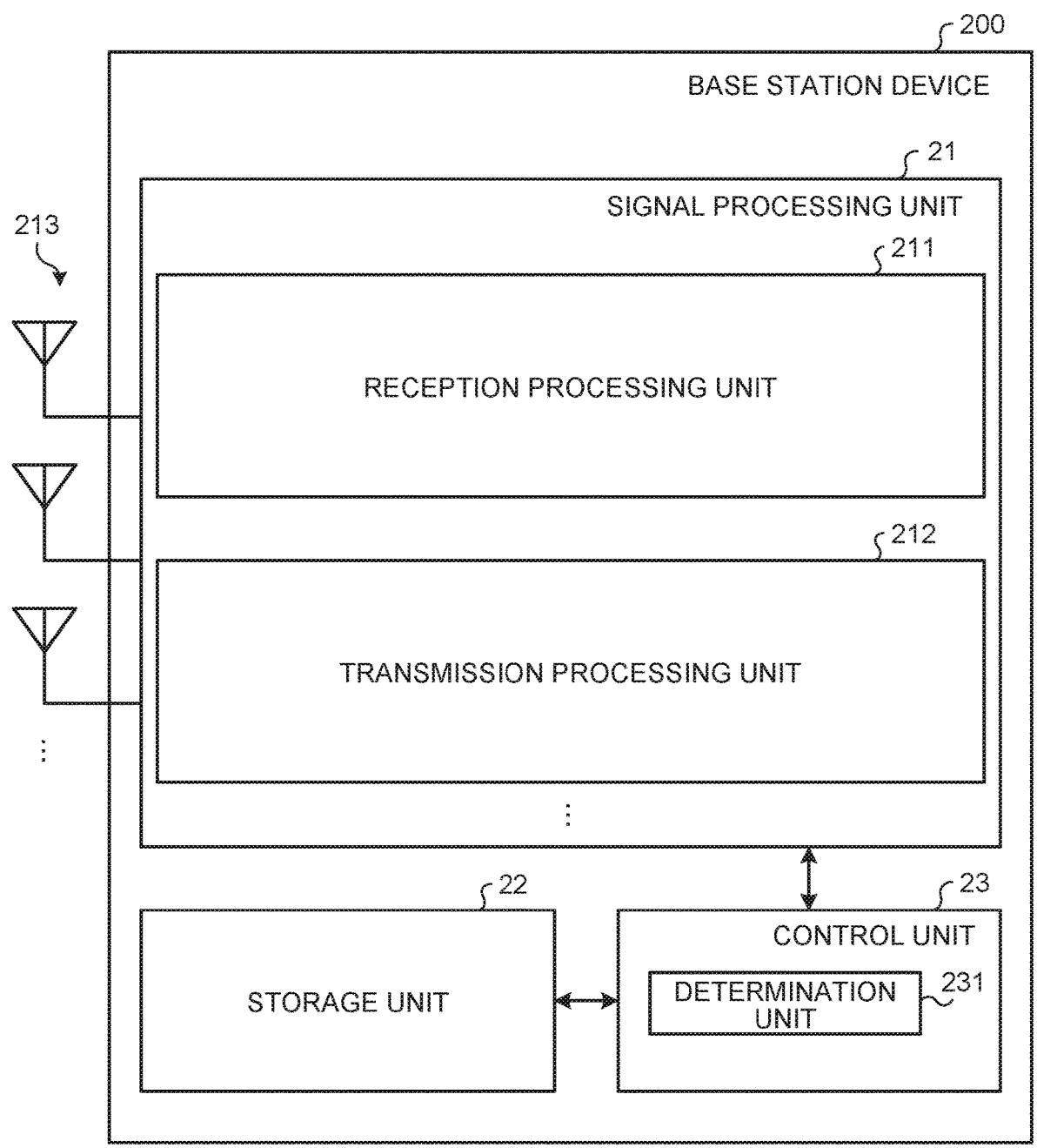
FIG. 2 is a diagram illustrating an example of a configuration of a base station device according to an embodiment of the present disclosure.

Here, an example of a configuration of the base station device 200 will be described with reference to FIG. 2. FIG. 2 is a diagram illustrating an example of a configuration of the base station device 200 according to an embodiment of the present disclosure. The base station device 200 includes a signal processing unit 21, a storage unit 22, and a control unit 23. Note that the configuration illustrated in FIG. 2 is a functional configuration, and a hardware configuration may be different from the functional configuration. Furthermore, the functions of the base station device 200 may be implemented in a distributed manner by a plurality of physically separated configurations.

The signal processing unit 21 is a signal processing unit for wirelessly communicating with another wireless communication device (e.g., the terminal device 400). The signal processing unit 21 operates according to the control of the control unit 23. The signal processing unit 21 supports one or more radio access schemes. For example, the signal processing unit 21 supports both NR and LTE. The signal processing unit 21 may support W-CDMA and cdma2000 in addition to NR and LTE.

The signal processing unit 21 includes a reception processing unit 211, a transmission processing unit 212, and an antenna 213. The signal processing unit 21 may include a plurality of reception processing units 211, a plurality of transmission processing units 212, and a plurality of antennas 213. Note that, in a case where the signal processing unit 21 supports a plurality of radio access schemes, each unit of the signal processing unit 21 can be configured individually for each radio access scheme. For example, the reception processing unit 211 and the transmission processing unit 212 may be individually configured for LTE and NR.

The storage unit 22 is a storage device capable of reading and writing data, such as a DRAM, an SRAM, a flash memory, or a hard disk. The storage unit 22 functions as a storage means of the base station device 200.

The control unit 23 is a controller that controls each unit of the base station device 200. The control unit 23 is realized, for example, by a processor such as a central processing unit (CPU) or a micro processing unit (MPU). For example, the control unit 23 is realized by the processor executing various programs stored in a storage device inside the base station device 200 using a random access memory (RAM) or the like as a work area. Note that the control unit 23 may be realized by an integrated circuit such as an application specific integrated circuit (ASIC) or a field programmable gate array (FPGA). Any of the CPU, the MPU, the ASIC, and the FPGA can be regarded as a controller.

<1.3. Example of Configuration of Terminal Device>

The terminal device 400 is a wireless communication device that wirelessly communicates with the base station device 200. For example, the terminal device 400 is a mobile phone, a smart device (a smartphone or a tablet), a personal digital assistant (PDA), or a personal computer. Furthermore, the terminal device 40 may be a device such as a camera for business use having a communication function, or may be a motorcycle, a moving relay vehicle, or the like on which a communication device such as a field pickup unit (FPU) is mounted. Furthermore, the terminal device 40 may be a machine to machine (M2M) device or an Internet of Things (IoT) device. The terminal device 400 is a type of information processing device (communication device).

Furthermore, the terminal device 400 may be capable of sidelink communication with another terminal device 400. The terminal device 400 may be able to use an automatic retransmission technology such as HARQ when performing sidelink communication. Furthermore, the terminal device 400 may be able to perform LPWA communication with another communication device (e.g., the base station device 200 and another terminal device 400). In addition, the wireless communication used by the terminal device 400 may be wireless communication using millimeter waves. Note that the wireless communication (including sidelink communication) used by the terminal device 400 may be wireless communication using radio waves or wireless (optical wireless) communication using infrared light or visible light.

Furthermore, the terminal device 400 may be a mobile device. Here, the mobile device is a movable wireless communication device. At this time, the terminal device 400 may be a wireless communication device installed in a mobile body, or may be a mobile body itself. For example, the terminal device 400 may be a vehicle that moves on a road such as an automobile, a bus, a truck, or a motorcycle, or a wireless communication device mounted on the vehicle. Note that the mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

Note that the terminal device 400 is not necessarily a device directly used by a person. The terminal device 400 may be a sensor installed in a machine or the like of a factory like so-called machine type communication (MTC). Furthermore, the terminal device 400 may be a machine to machine (M2M) device or an Internet of Things (IoT) device. Furthermore, the terminal device 400 may be a device having a relay communication function as represented by device to device (D2D) and vehicle to everything (V2X). Furthermore, the terminal device 400 may be a device called a client premises equipment (CPE) used for wireless backhaul or the like.

Figure 3:
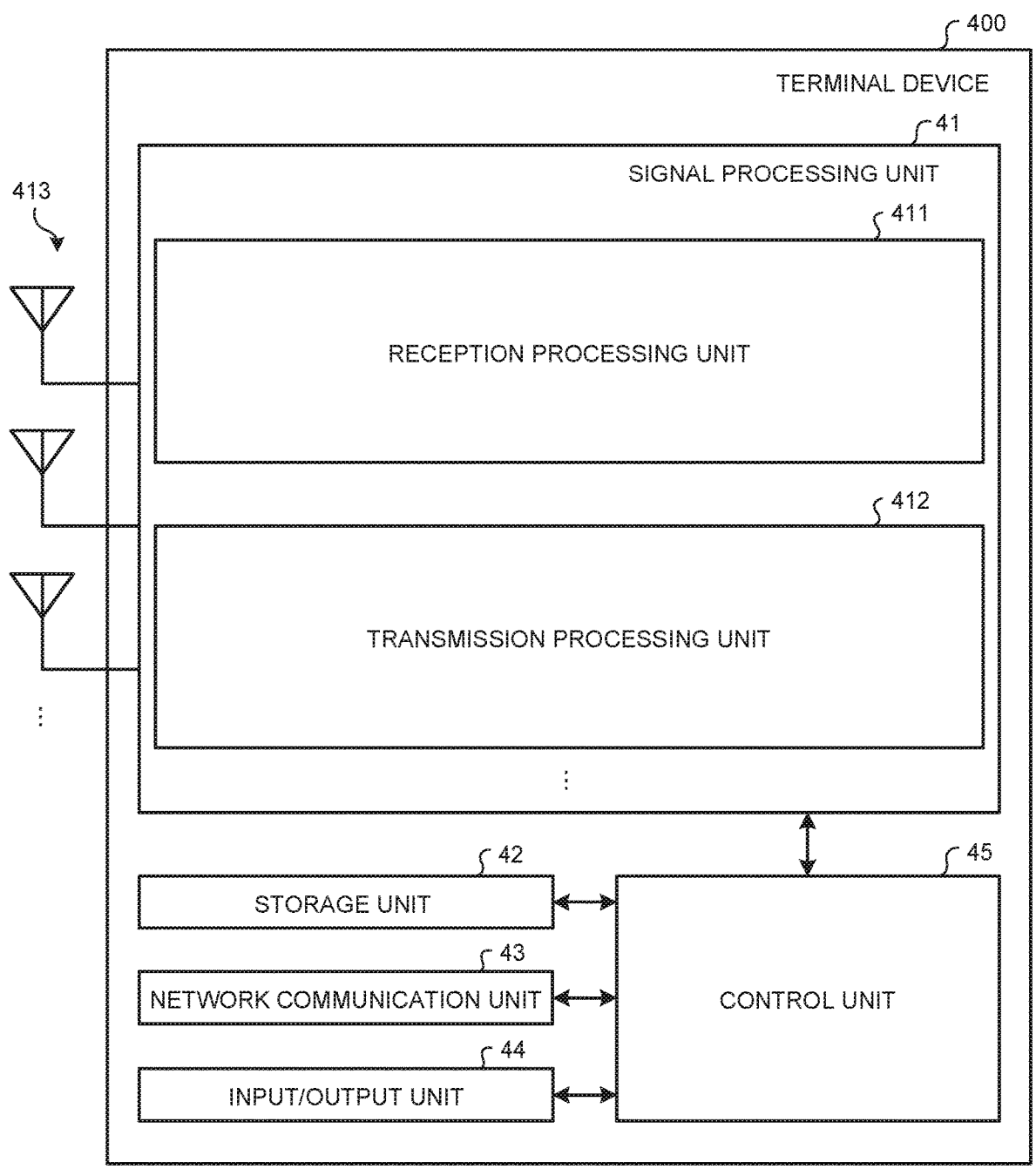
FIG. 3 is a diagram illustrating an example of a configuration of a terminal device according to an embodiment of the present disclosure.

An example of a configuration of the terminal device 400 will be described with reference to FIG. 3. FIG. 3 is a diagram illustrating an example of a configuration of the terminal device 400 according to an embodiment of the present disclosure. The terminal device 400 includes a signal processing unit 41, a storage unit 42, a network communication unit 43, an input/output unit 44, and a control unit 45. Note that the configuration illustrated in FIG. 3 is a functional configuration, and a hardware configuration may be different from the functional configuration. Furthermore, the functions of the terminal device 400 may be implemented in a distributed manner by a plurality of physically separated configurations.

The signal processing unit 41 is a signal processing unit for wirelessly communicating with another wireless communication device (e.g., the base station device 200). The signal processing unit 41 operates according to the control of the control unit 45. The signal processing unit 41 supports one or more radio access schemes. For example, the signal processing unit 41 supports both NR and LTE. The signal processing unit 41 may support W-CDMA and cdma2000 in addition to NR and LTE.

The signal processing unit 41 includes a reception processing unit 411, a transmission processing unit 412, and an antenna 413. The signal processing unit 41 may include a plurality of reception processing units 411, a plurality of transmission processing units 412, and a plurality of antennas 413. Note that, in a case where the signal processing unit 41 supports a plurality of radio access schemes, each unit of the signal processing unit 41 can be configured individually for each radio access scheme. For example, the reception processing unit 411 and the transmission processing unit 412 may be individually configured for LTE and NR.

The storage unit 42 is a storage device capable of reading and writing data, such as a DRAM, an SRAM, a flash memory, or a hard disk. The storage unit 42 functions as a storage unit of the terminal device 400.

The network communication unit 43 is a communication interface for communicating with another device. For example, the network communication unit 43 is a LAN interface such as an NIC. The network communication unit 43 may be a wired interface or a wireless interface. The network communication unit 43 functions as a network communication means of the terminal device 400. The network communication unit 43 communicates with another device according to the control of the control unit 45.

The input/output unit 44 is a user interface for exchanging information with a user. For example, the input/output unit 44 is an operation device for the user to perform various operations, such as a keyboard, a mouse, an operation key, or a touch panel. Alternatively, the input/output unit 44 is a display device such as a liquid crystal display or an organic electroluminescence display. The input/output unit 44 may be an acoustic device such as a speaker or a buzzer. The input/output unit 44 may be a lighting device such as a light emitting diode (LED) lamp. The input/output unit 44 functions as an input/output means (an input means, an output means, an operation means, or a notification means) of the terminal device 400.

The control unit 45 is a controller that controls each unit of the terminal device 40. The control unit 45 is realized, for example, by a processor such as a CPU or an MPU. For example, the control unit 45 is realized by the processor executing various programs stored in a storage device inside the terminal device 400 using a RAM or the like as a work area. Note that the control unit 45 may be realized by an integrated circuit such as an ASIC or an FPGA. Any of the CPU, the MPU, the ASIC, and the FPGA can be regarded as a controller.

2. Error Correction Coding

Next, error correction coding according to an embodiment of the present disclosure will be described. The base station device 200 and the terminal device 400 perform error correction coding (forward error correction (FEC)) different from that performed in the PHY layer. In order to distinguish these different types of error correction coding, the error correction coding performed by the base station device 200 and the terminal device 400 according to the present embodiment is referred to as first FEC, and the error correction coding performed in the PHY layer is referred to as second FEC.

The base station device 200 and the terminal device 400 perform the first FEC, but may also perform the second FEC. In a case where both the first FEC and the second FEC are performed, the base station device 200 and the terminal device 400 perform error correction encoding processing in the order of the first FEC and the second FEC.

First, in order to describe the first FEC in detail, a case in which the base station device 200 and the terminal device 400 perform both the first FEC and the second FEC will be described.

As described above, the base station device 200 and the terminal device 400 can perform communication using a plurality of error correction (forward error correction (FEC)) codes. Here, the description will be made for a case in which the base station device 200 and the terminal device 400 use two error correction codes, i.e. a first FEC code and a second FEC code, but the number of error correction codes may be three or more.

<2.1. First FEC>

Figure 4A:
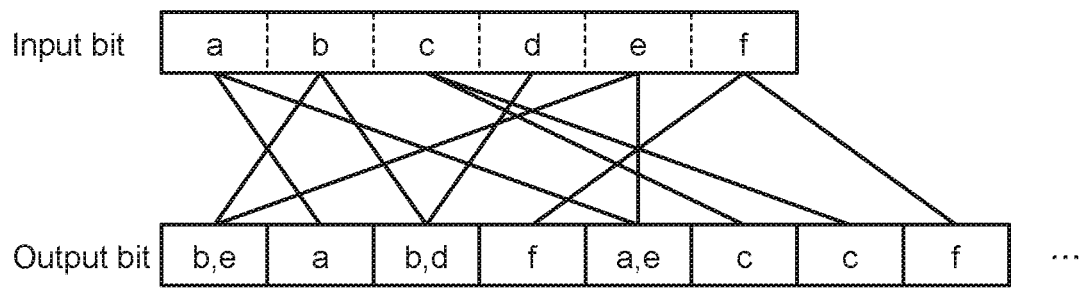
FIG. 4A is a diagram for explaining an overview of first FEC according to an embodiment of the present disclosure.
Figure 4B:
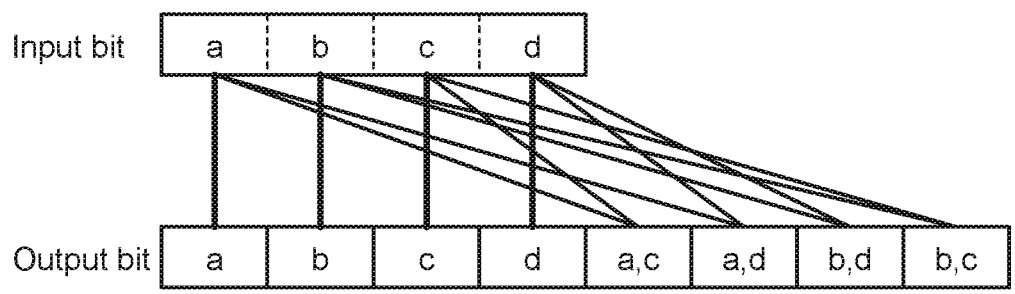
FIG. 4B is a diagram for explaining an overview of first FEC according to an embodiment of the present disclosure.

First, error correction coding applied as first FEC in the system according to an embodiment of the present disclosure will be described with reference to FIGS. 4A and 4B. FIGS. 4A and 4B are diagrams for explaining an overview of the first FEC according to an embodiment of the present disclosure.

As illustrated in FIG. 4A, the first FEC is error correction coding for generating one or more bit sequences from one bit sequence. For example, it is assumed that an input bit sequence is a bit sequence represented by {a, b, c, d, e, f}. In this case, an output in a case where first FEC is applied is a bit sequence group including a plurality of bit sequences, such as {b, e}, {a}, {b, d}, {f}, {a, e}, {c}, {c}, {f}, . . . . Here, for example, the plurality of bit sequences (e.g., {b, e}, {b, d}, and {a, e}) may be bit sequences in each of which at least some parts of the input bit sequence are sequentially arranged. Alternatively, the plurality of bit sequences may be obtained by performing bit operations such as AND, OR, XOR, and NOT on at least some parts of the input bit sequence.

In addition, the first FEC may generate an output bit sequence group as illustrated in FIG. 4B, and at this time, the output bit sequence group may include a first bit sequence group that is necessarily transmitted by the transmission side and a second bit sequence group that can be decoded by the reception side although not transmitted by the transmission side. In other words, the first bit sequence group is a bit sequence group that includes an input bit sequence and can be decoded by the reception side without performing first FEC decoding. The second bit sequence group is a bit sequence group including at least one part of the input bit sequence, and is combined with the first bit sequence group for use in first FEC decoding on the reception side. For example, in FIG. 4B, a bit sequence group including first to fourth bit sequences from the left corresponds to the first bit sequence group, and the other bit sequences correspond to the second bit sequence group.

Table 1 is a table showing examples of first FEC codes. As shown in Table 1, it is preferable to use an FEC code such as an erasure code, a rateless code, or a fountain code as the first FEC code having the above-described feature. Alternatively, it is preferable to use, as the first FEC code, an FEC code for coding a plurality of bit sequences by linear synthesis or XOR synthesis.

TABLE 1

Example of first FEC code

Erasure code
Rateless code
Fountain code
Tornado code
LT code
Raptor code
RaptorQ code
XOR code <2.2. Second FEC>

Figure 5:
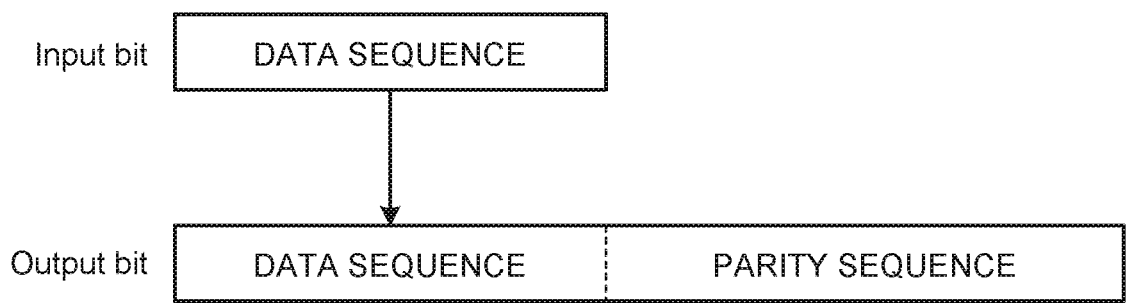
FIG. 5 is a diagram for explaining an overview of second FEC according to an embodiment of the present disclosure.

Next, error correction coding applied as second FEC in the system according to an embodiment of the present disclosure will be described with reference to FIG. 5. FIG. 5 is a diagram for explaining an overview of second FEC according to an embodiment of the present disclosure.

As illustrated in FIG. 5, the second FEC is error correction coding for generating one bit sequence from one bit sequence. For example, as illustrated in FIG. 5, the transmission side adds a parity sequence to one input bit sequence including a data sequence to output one output bit sequence.

For example, in a case where second FEC is performed on the bit sequence group to which the first FEC is applied as illustrated in FIGS. 4A and 4B, the transmission side adds a parity sequence to each of the bit sequences included in the bit sequence group to generate an output bit sequence group. More specifically, it is assumed that the transmission side performs second FEC on a bit sequence group such as {b, e}, {a}, {b, d}, {f}, {a, e}, {c}, {c}, {f}, . . . . In this case, the transmission side assigns a parity sequence w1 to {b, e} to generate an output bit sequence {b, e, w1}. The transmission side similarly assigns parity sequences w2, . . . to {a}, {b, d}, {f}, {a, e}, {c}, {c}, {f}, . . . , to generate an output bit sequence group including {a, w2}, {b, d, w3}, {f, w4}, {a, e, w5}, {c, w6}, {c, w7}, {f, w8}, . . . .

Table 2 is a table showing examples of second FEC codes. As shown in Table 2, it is preferable to use, as the second FEC code having the above-described feature, an FEC code such as a convolutional code, a turbo code, a low density parity check (LDPC) code, or a polar code.

TABLE 2

Example of second FEC code

Convolutional code
Turbo code
LDPC code
Polar code

<2.3. FEC Processing>
(Protocol Stack)

Figure 6:
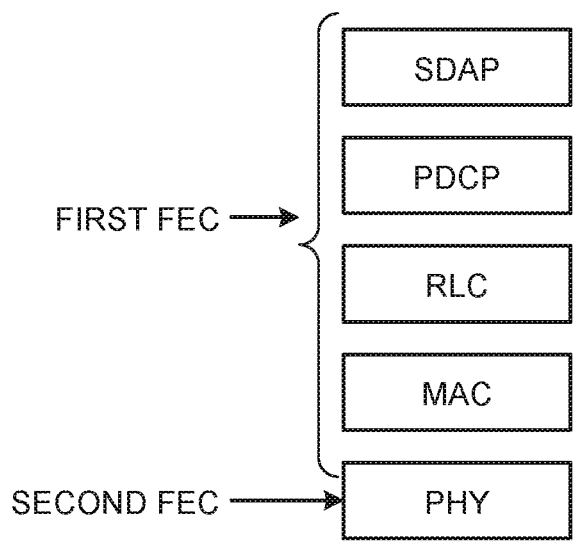
FIG. 6 is a diagram illustrating an example of a protocol stack to which first FEC and second FEC are applied according to an embodiment of the present disclosure.

FIG. 6 is a diagram illustrating an example of a protocol stack to which first FEC and second FEC are applied according to an embodiment of the present disclosure. As an example of the protocol stack, 5G New Radio (NR) is illustrated in FIG. 6.

The protocol stack for NR control information communication includes, from the lower layer, a physical (PHY) layer, a media access control (MAC) layer, a radio link control (RLC) layer, a packet data convergence protocol (PDCP) layer, and a service data adaptive protocol (SDAP) layer.

In the SDAP layer, an identifier indicating quality of service (QoS) is notified. In the PDCP layer, compression and decompression of an IP header, encryption, data replication, etc. are performed. In the RLC layer, controls for combining, dividing, and retransmitting data, etc. are performed.

In the MAC layer, channel multiplexing, channel demultiplexing, hybrid-automatic repeat request (ARQ) processing, scheduling, prioritization, etc. are performed. In the PHY layer, modulation/demodulation, error correction coding, multi-antenna processing, resource allocation, etc. are performed.

Here, the first FEC according to the present embodiment is performed in a layer (any one of the MAC layer, the RLC layer, the PDCP layer, and the SDAP layer) upper than the PHY layer. In addition, the second FEC is applied for the error correction coding in the PHY layer described above. In this manner, the second FEC is performed in the PHY layer.

Note that the protocol stack illustrated in FIG. 6 is an example, and the present invention is not limited thereto. The first FEC and the second FEC may be applied to a protocol stack other than what is illustrated in FIG. 6.

(Transmission Processing)

Figure 7:
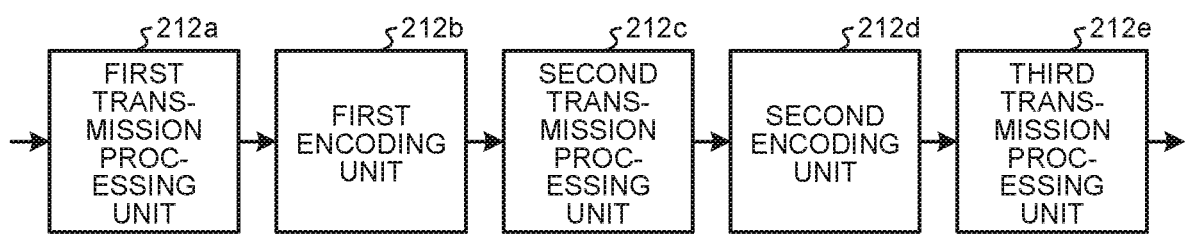
FIG. 7 is a diagram illustrating an example of a configuration of a transmission processing unit of the base station device according to an embodiment of the present disclosure.

Next, an example of transmission processing according to an embodiment of the present disclosure will be described with reference to FIG. 7. FIG. 7 is a diagram illustrating an example of a configuration of the transmission processing unit 212 of the base station device 200 according to an embodiment of the present disclosure. Here, the transmission processing performed by the transmission processing unit 212 of the base station device 200 will be described, but the transmission processing unit 412 of the terminal device 400 also performs similar processing.

The transmission processing unit 212 includes a first transmission processing unit 212a, a first encoding unit 212b, a second transmission processing unit 212c, a second encoding unit 212d, and a third transmission processing unit 212e. Note that the configuration illustrated in FIG. 7 is a functional configuration, and a hardware configuration may be different from the functional configuration.

The first encoding unit 212b performs first error correction encoding processing (first FEC) on one or more input data sequences to generate a group including one or more output data sequences.

The second encoding unit 212d performs second error correction encoding processing (second FEC) on one input data sequence to generate one output data sequence. When the transmission processing unit 212 performs the first FEC, a plurality of output data sequences (an output data sequence group) is input to the second encoding unit 212d. In this case, the second encoding unit 212d performs second FEC on each of the plurality of output data sequences input thereto to generate each output data sequence.

The signal processing performed by the first transmission processing unit 212a and the second transmission processing unit 212c is determined depending on what layer of the protocol stack illustrated in FIG. 6 the first FEC is performed in. For example, in a case where the first FEC is performed after data replication in the PDCP layer, the first transmission processing unit 212a performs signal processing performed in the SDAP layer, processing performed before the data replication in the PDCP layer, etc. Furthermore, the second transmission processing unit 212c performs processing performed in the RLC layer and the MAC layer, processing performed before error correction encoding processing in the PHY layer, etc.

The third transmission processing unit 212e performs processing performed after the error correction encoding processing in the PHY layer, etc.

The transmission processing unit 212 generates a first transmission signal obtained by performing the first FEC and the second FEC, and transmits the first transmission signal to the terminal device 400 that is a communication counterpart via the antenna 213. Note that the signal processing unit 21 and the antenna 213 illustrated in FIG. 2 are an example of a communication unit.

Note that the base station device 200 according to an embodiment of the present disclosure may not perform the second FEC while performing the first FEC, which will be described in detail later. In this case, the transmission processing unit 212 does not perform processing in the second encoding unit 212d, while performing transmission signal processing in the second transmission processing unit 212c, and then performing transmission signal processing in the third transmission processing unit 212e.

(Reception Processing)

Figure 8:
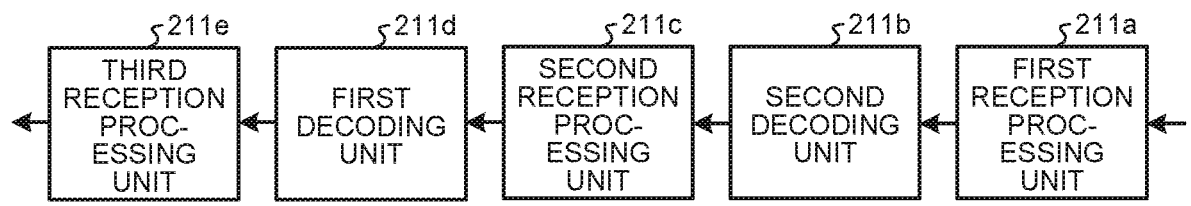
FIG. 8 is a diagram illustrating an example of a configuration of a reception processing unit of the base station device according to an embodiment of the present disclosure.

Next, an example of reception processing according to an embodiment of the present disclosure will be described with reference to FIG. 8. FIG. 8 is a diagram illustrating an example of a configuration of the reception processing unit 211 of the base station device 200 according to an embodiment of the present disclosure. Here, the reception processing performed by the reception processing unit 211 of the base station device 200 will be described, but the reception processing unit 411 of the terminal device 400 also performs similar processing. The reception processing unit 211 receives, as a reception signal, the transmission signal obtained by performing the second FEC and the first FEC via the antenna unit 213.

The reception processing unit 211 includes a first reception processing unit 211a, a second decoding unit 211b, a second reception processing unit 211c, a first decoding unit 211d, and a third reception processing unit 211e. Note that the configuration illustrated in FIG. 8 is a functional configuration, and a hardware configuration may be different from the functional configuration.

The second decoding unit 211b performs second error correction decoding processing on one input sequence to which the second FEC is applied to generate one output sequence.

The first decoding unit 211d performs first error correction decoding processing on one or more input sequences to which the first FEC is applied to generate one or more output sequences.

The first reception processing unit 211a performs reception processing performed before the second error correction decoding processing, etc.

The signal processing performed by the second reception processing unit 211c and the third reception processing unit 211e is determined depending on what layer of the protocol stack on the transmission side the first FEC is performed on the reception signal in. The second reception processing unit 211c performs reception signal processing after the second error correction decoding processing and before the first error correction decoding processing. The third reception processing unit 211e performs reception signal processing after the first error correction decoding processing.

Note that, for the reception signal on which the second FEC is not performed, the reception processing unit 211 does not perform processing in the first decoding unit 211b, while performing reception signal processing in the first reception processing unit 211a, and then performing reception signal processing in the second reception processing unit 211c.

Furthermore, the reception processing unit 211 may decode the reception signal without performing first FEC decoding processing (first error correction decoding processing) on the reception signal, which will be described in detail later. As described above, there are a case where the reception processing unit 211 functions as a first decoding processing unit that does not perform the first FEC decoding processing and a case where the reception processing unit 211 functions as a second decoding processing unit that performs the first FEC decoding processing.

(Flow of Communication Processing)

Subsequently, communication processing in a case where the system performs the first FEC and the second FEC will be described.

Figure 9:
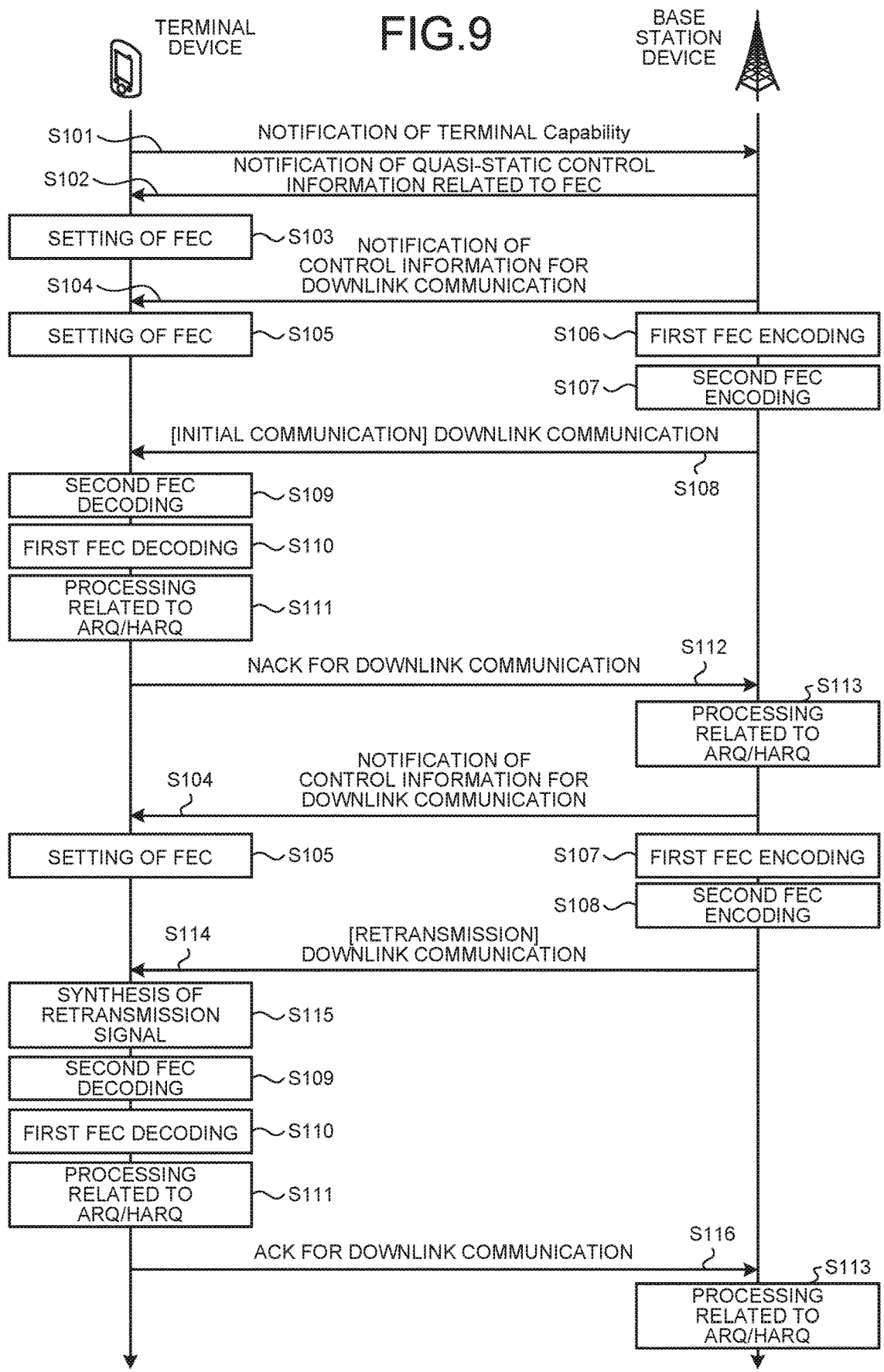
FIG. 9 is a sequence diagram illustrating an example of downlink communication processing in a case where first FEC and second FEC are performed.

FIG. 9 is a sequence diagram illustrating an example of downlink communication processing in a case where the first FEC and the second FEC are performed. In the downlink communication, the base station device 200 serves as a transmission side (transmission device), and the terminal device 400 serves as a reception side (reception device). In this case, it is preferable that the transmission device (base station device 200) notify the reception device (terminal device 400) of whether to apply first FEC and a specific configuration parameter.

As illustrated in FIG. 9, the terminal device 400 notifies a base station device 200 of a cell 20 to which the terminal device 400 itself is connected of information regarding the terminal capability of the terminal device 400 (Step S101). The information also includes information regarding the capability of the first FEC. The information regarding the terminal capability is notified during the initial access or after the initial access.

As a physical channel for the notification, at least one of a physical random access channel (PRACH), a physical uplink control channel (PUCCH), and a physical uplink shared channel (PUSCH) is used.

The base station device 200 notifies a terminal device 400 connected to the cell 20 managed by the base station device 200 of quasi-static control information related to first FEC (Step S102).

The quasi-static control information may be cell-specific control information. The control information is notified during the initial access or after the initial access. Alternatively, the control information may be notified as a part of an RRC procedure, such as RRC signaling, RRC configuration, or RRC reconfiguration. Alternatively, the control information may be periodically notified from the base station device 200 to the terminal device 400.

As a physical channel for notifying the control information, at least one of a physical broadcast channel (PBCH), a physical downlink control channel or an enhanced physical downlink control channel (EPDCCH), and a physical downlink shared channel is used.

Receiving the quasi-static control information, the terminal device 400 sets the first FEC on the basis of the control information (Step S103).

Thereafter, it is assumed that downlink communication occurs from the base station device 200 to the terminal device 400. More specifically, it is assumed that downlink communication occurs, for example, because the terminal device 400 has requested data downloading (pulling) or push data is generated to the terminal device 400.

In addition, the base station device 200 notifies the terminal device 400 of control information (dynamic control information) such as radio resources used for downlink communication from the base station device 200 (Step S104).

The dynamic control information may be UE-specific control information for each terminal device 400 or UE-group-specific control information for each terminal group. Here, the terminal group is, for example, a group of one or more terminal devices 400 which are transmission destination targets in a case where the downlink communication is performed in multicast or broadcast.

Furthermore, the dynamic control information includes information regarding the following resources for allocating downlink communication to the target terminal device 400 (or terminal group).

Frequency resource
Time resource
Spatial resource

Examples of the frequency resource include a resource block, a subcarrier, and a subcarrier group.

In addition, examples of the time resource include a subframe, a slot, a mini-slot, and a symbol.

In addition, examples of the spatial resource include an antenna, an antenna port, a spatial layer, and a spatial stream.

The dynamic control information includes the following information.

Non-orthogonal resources (resources related to power and interleave pattern) for non-orthogonal multiple access (NOMA), multiuser superposition transmission (MUST), interleave division multiple access (IDMA), and codo division multiple access (CDMA).

Information regarding a modulation level and an FEC coding rate of a lower layer (physical layer) (modulation and coding set (MCS))

Information regarding a coding method and a coding rate of first FEC

Information regarding a coding method and a coding rate of second FEC

ARQ/HARQ settings (new data indicator (NDI), redundancy version (RV), and the like)

Receiving the dynamic control information, the terminal device 400 performs settings for appropriately receiving downlink communication, including settings for the first FEC and the second FEC, on the basis of the control information (Step S105).

The base station device 200 performs encoding and modulation on downlink communication data to be transmitted to the terminal device 400 to match the control information notified to the terminal device 400. Here, the base station device 200 performs encoding including first FEC encoding and modulation (Step S106), and performs encoding including second FEC encoding and modulation (Step S107). The base station device 200 transmits the generated data to the terminal device 400 as a radio signal. This is initial downlink communication performed by the base station device 200 (Step S108).

The terminal device 400 receives, demodulates, and decodes the radio signal from the base station device 200 in a lower layer and an upper layer according to the settings specified in the control information. At this time, the terminal device 400 performs second FEC decoding (Step S109) and performs first FEC decoding (Step S110).

The terminal device 400 performs ARQ/HARQ processing depending on whether the decoding of the data has succeeded or failed (Step S111). Specifically, the terminal device 400 sends ACK or NACK to the base station device 200 as a response depending on whether the decoding of the data has succeeded or failed. In addition, it is preferable that the terminal device 400 differently set ARQ/HARQ processing depending on whether the decoding of the data has succeeded or failed. For example, when the decoding has failed, it is preferable that the terminal device 400 stores a decoding result or data in the middle of decoding (a soft determination value, a log likelihood ratio (LLR), etc.) in a memory in order to perform retransmission and synthesis for a next HARQ.

Here, it is assumed that the terminal device 400 has failed to decode the data, and sends NACK as a response (Step S112).

According to ACK/NACK received from the terminal device 400, the base station device 200 performs ARQ/HARQ processing (Step S113). The base station device 200 executes subsequent processing that needs to be performed according to ACK/NACK received from the terminal device 400. Here, since NACK is notified, the base station device 200 performs preparation for retransmission according to ARQ/HARQ. The preparation for retransmission may include selecting an RV, selecting an MCS, selecting a radio resource, setting first FEC, setting second FEC, and the like. Note that, in a case where ACK is received from the terminal device 400, this means that the target data can be transmitted and received without any problem, and thus, the base station device 200 shifts to next communication of new data.

According to the ARQ/HARQ processing corresponding to ACK/NACK, the base station device 200 proceeds to perform retransmission of data or downlink communication of new data. To this end, the base station device 200 notifies the target terminal device 400 of dynamic control information again, and executes downlink communication according to settings specified in the dynamic control information.

Here, the base station device 200 performs retransmission of data, for example, because it has received NACK. Note that the retransmission processing performed by the base station device 200 is the same as the initial transmission processing. Thus, the same reference signs will be given, and the description thereof will be omitted. The base station device 200 performs retransmission processing and transmits retransmission data through downlink communication (Step S114).

The terminal device 400 synthesizes the retransmission signal from the base station device 200 with the radio signal for the initial communication received in Step S108 (Step S115). Reception processing performed thereafter is the same as the processing performed after receiving the initial transmission data. Thus, the same reference signs will be given, and the description thereof will be omitted.

Here, the terminal device 400 succeeds in decoding the data and sends ACK as a response (Step S116). The base station device 200 performs ARQ/HARQ processing (Step S113). Here, since ACK is notified, the base station device 200 shifts to next communication of new data.

(Problem)

Figure 10:
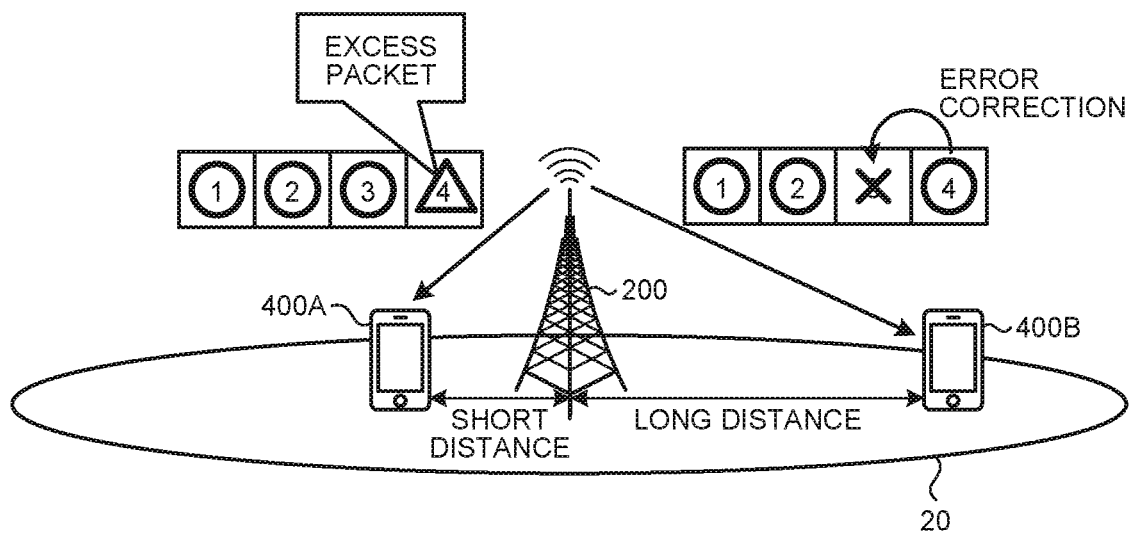
FIG. 10 is a diagram for explaining communication between a base station device and a terminal device.

Here, a problem caused by performing the first FEC will be described with reference to FIG. 10. FIG. 10 is a diagram for explaining communication between the base station device 200 and the terminal device 400.

As illustrated in FIG. 10, the base station device 200 transmits the same transmission signal to each of a first terminal device 400A and a second terminal device 400B in the cell 20. The transmission signal is obtained by performing the first FEC encoding on a data sequence to be transmitted, and includes a plurality of bit sequences. Here, it is assumed that the number of the plurality of bit sequences is 4, and the bit sequences correspond to packets 1 to 4, respectively. In addition, it is assumed that the packets 1 to 3 belong to a first bit sequence group capable of decoding the data sequence without performing the first FEC decoding, and the packet 4 belongs to a second bit sequence group to be used for the first FEC decoding.

At this time, it is assumed that the second terminal device 400B is far away from the base station device 200, and a propagation path therebetween has poor propagation quality (e.g., channel quality). For this reason, in FIG. 10, the second terminal device 400B has succeeded in receiving the packets 1, 2, and 4, but has failed in receiving the packet 3. When the quality of the propagation path is poor as described above, the second terminal device 400B is highly likely to fail in receiving some of the packets.

Therefore, the second terminal device 400B performs the first FEC decoding using the successfully received packets 1, 2, and 4. As a result, the second terminal device 400B can decode the packet 3 that the second terminal device 400B has failed in receiving, and can perform communication with higher reliability and lower delay even in a case where the propagation channel is in a poor condition (quality), as compared with communication when retransmission is performed.

On the other hand, it is assumed that the first terminal device 400A is close to the base station device 200, and a propagation path therebetween has good propagation quality (channel quality). For this reason, in FIG. 10, the first terminal device 400A has successfully received all the packets 1 to 4 transmitted by the base station device 200. In this case, the first terminal device 400A can decode the data sequence from the packets 1 to 3, and the packet 4 becomes an excess packet, resulting in a decrease in frequency utilization efficiency.

As described above, by performing the first FEC, the system can realize communication with higher reliability and lower delay. However, in a case where the propagation channel is in a good condition, the first FEC decreases frequency utilization efficiency. Therefore, a technology capable of suppressing a decrease in frequency utilization efficiency while realizing communication with higher reliability and lower delay is required.

In addition, there is a problem that performing the first FEC increases a processing amount for encoding and a processing amount for decoding. Therefore, it is also preferable to further reduce processing (encoding processing and decoding processing) related to the first FEC.

3. Technical Feature

At this point, with respect to the plurality of bit sequences obtained by performing the first FEC encoding, the system according to an embodiment of the present disclosure transmits a first bit sequence group to be necessarily transmitted and a second bit sequence group to be used for the first FEC decoding through different propagation paths. The propagation paths include carriers, links, resources, or the like. When transmission signals are transmitted through different propagation paths, the base station device 200 transmits the transmission signals through different carriers, different links, or different resources, respectively.

Figure 11:
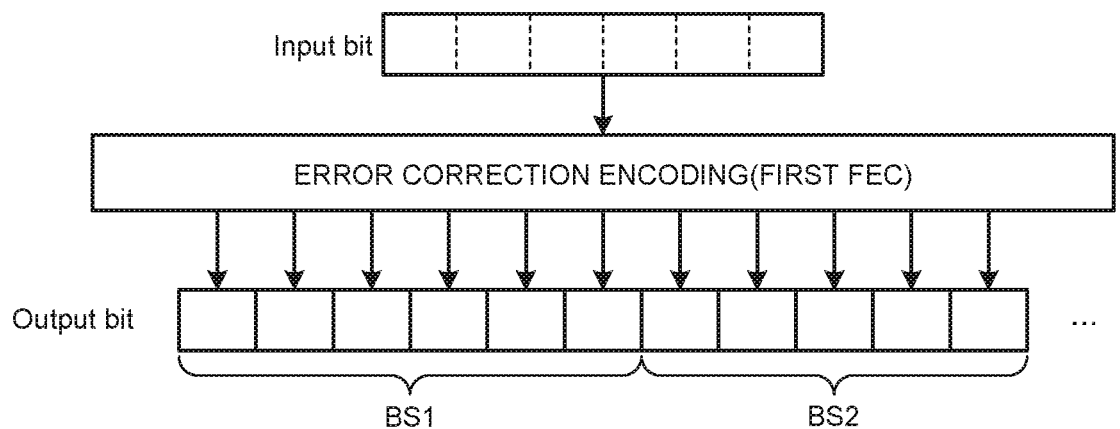
FIG. 11 is a diagram for explaining a transmission signal according to an embodiment of the present disclosure.

FIG. 11 is a diagram for explaining a transmission signal according to an embodiment of the present disclosure.

The base station device 200 performs the first FEC encoding on a data sequence to be transmitted as input bits. As a result, the base station device 200 obtains a plurality of bit sequences as output bits.

The plurality of bit sequences are divided into a first bit sequence group BS1 capable of decoding the data sequence without performing the first FEC decoding and a second bit sequence group BS2 to be used for the first FEC decoding. The base station device 200 determines to transmit the first bit sequence group BS1 and the second bit sequence group BS2 through different propagation paths. Such determination is performed by a determination unit 231 of the base station device 200 illustrated in FIG. 2.

The first bit sequence group BS1 is a bit sequence group to be necessarily transmitted. If any one of the bit sequences in the first bit sequence group BS1 is not transmitted, the reception side cannot correctly decode the data sequence.

The second bit sequence group BS2 is a bit sequence group that is not necessarily transmitted as long as the first bit sequence group BS1 is successfully received. When the first bit sequence group BS1 is successfully received, the reception side can correctly decode the data sequence even if the second bit sequence group BS2 is not received.

The second bit sequence group BS2 is used for error correction when the reception side has failed in receiving some bit sequences of the first bit sequence group BS1. That is, even when the reception side has failed in receiving some bit sequences of the first bit sequence group BS1, the reception side can decode the data sequence by performing the first FEC decoding using the first bit sequence group BS1 and the second bit sequence group BS2.

Therefore, the transmission side needs to transmit the first bit sequence group BS1 to all destinations to which the data sequence is to be transmitted. On the other hand, the transmission side may transmit the second bit sequence group BS2 to a transmission destination which is in a poor condition for propagation channel. The transmission side does not necessarily transmit the second bit sequence group BS2 to a transmission destination that is less likely to fail in receiving the first bit sequence group BS1 with a good condition for propagation channel.

Therefore, the base station device 200 determines to transmit the first bit sequence group BS1 and the second bit sequence group BS2 through different propagation paths. As a result, the base station device 200 can be configured to transmit the second bit sequence group BS2 to a transmission destination to which it is better to transmit the second bit sequence group BS2 and not to transmit the second bit sequence group BS2 to a transmission destination to which it is not necessary to transmit the second bit sequence group BS2, thereby improving frequency utilization efficiency.

Hereinafter, the communication method will be described in more detail with an example of the propagation path.

(Transmission from Multiple Base Station Devices)

Figure 12:
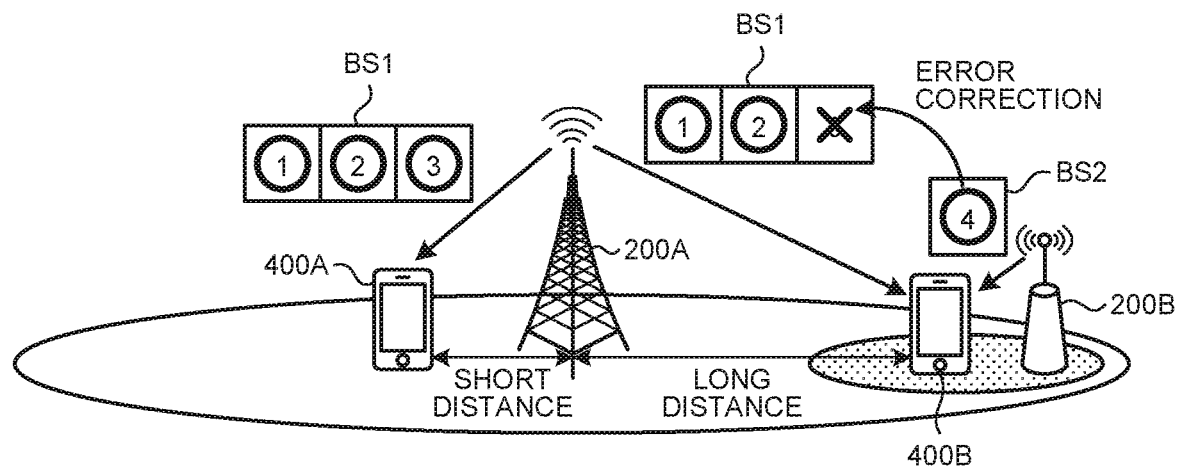
FIG. 12 is a diagram for explaining an example of a communication method according to an embodiment of the present disclosure.

FIG. 12 is a diagram for explaining an example of a communication method according to an embodiment of the present disclosure. As illustrated in FIG. 12, in the communication method according to the present embodiment, two base station devices 200 transmit common data to two terminal devices 400. Note that the common data is, for example, data transmitted in broadcast or multicast.

A first base station device 200A is a macro cell base station device, and a second base station device 200B is a small cell base station device. The first base station device 200A accommodates the first and second terminal devices 400A and 400B, and the second base station device 200B accommodates the second terminal device 400B.

In addition, it is assumed that a distance between the first base station device 200A and the first terminal device 400A is short, and a propagation loss is small. That is, it is assumed that a channel between the first base station device 200A and the first terminal device 400A is in a good condition.

On the other hand, it is assumed that a distance between the first base station device 200A and the second terminal device 400B is long, and a propagation loss is large. That is, it is assumed that a channel between the first base station device 200A and the second terminal device 400B is in a poor condition.

Here, the first base station device 200A transmits a first transmission signal to the first terminal device 400A and the second terminal device 400B. Packets 1 to 3 included in the first transmission signal belongs to a first bit sequence group BS1 to be necessarily transmitted among a plurality of bit sequences obtained by performing the first FEC encoding.

In addition, the second base station device 200B transmits a second transmission signal to the second terminal device 400B. A packet 4 included in the second transmission signal belongs to a second bit sequence group BS2 that does not need to be transmitted in decoding the data sequence, among the plurality of bit sequences obtained by performing the first FEC encoding.

Since the channel between the first base station device 200A and the first terminal device 400A is in a good condition, it is considered that the first terminal device 400A can successfully receive the first transmission signal and correctly decode the data sequence. On the other hand, since the channel between the first base station device 200A and the second terminal device 400B is in a poor condition, it is considered that the second terminal device 400B fails to receive the first transmission signal and cannot decode some of the packets 1 to 3. In the example of FIG. 12, the second terminal device 400B fails to decode the packet 3.

Here, the second base station device 200B is a small cell base station device as described above, and it is considered that a distance between the second base station device 200B and the second terminal device 400B is short, and a channel therebetween is in a good condition. Accordingly, the second terminal device 400B can correctly receive the second transmission signal from the second base station device 200B.

Therefore, the second terminal device 400B performs the first FEC decoding on the packets 1 to 4 using the packet 4 included in the second transmission signal received from the second base station device 200B.

As a result, the second terminal device 400B can correctly decode the data sequence using the first transmission signal and the second transmission signal.

As described above, the first base station device 200A can transmit a first transmission signal to be commonly transmitted to the first and second terminal devices 400A and 400B. In addition, the second terminal device 400B that is highly likely to require error correction can receive a second transmission signal from the second base station device 200B to more reliably decode the data sequence.

In this way, the first base station device 200A can continue to transmit the first transmission signal, which is a minimum requirement. As a result, the first base station device 200A does not need to transmit a redundant bit sequence, thereby making it possible to reduce a time delay up to completion of transmission of the data sequence. In addition, it is possible to efficiently use resources transmitted from the first base station device 200A.

In addition, the second base station device 200B only needs to transmit a second transmission signal without having to transmit a first transmission signal. Therefore, it is also possible to efficiently use resources transmitted from the second base station device 200B, as compared with the use of resources in a case where the data sequence on which the first FEC is performed is transmitted from the second base station device 200B to the second terminal device 400B.

In addition, since the first terminal device 400A can decode the data sequence from the first transmission signal, the first terminal device 400A does not need to perform the first FEC decoding processing, thereby suppressing an increase in processing amount for decoding and reducing a time delay up to completion of reception of the data sequence.

In addition, since the second terminal device 400B can decode the data sequence using the second transmission signal received from the second base station device 200B, it is possible to further reduce the number of times the first transmission signal is retransmitted, and it is also possible to suppress a decrease in frequency utilization efficiency.

Figure 13:
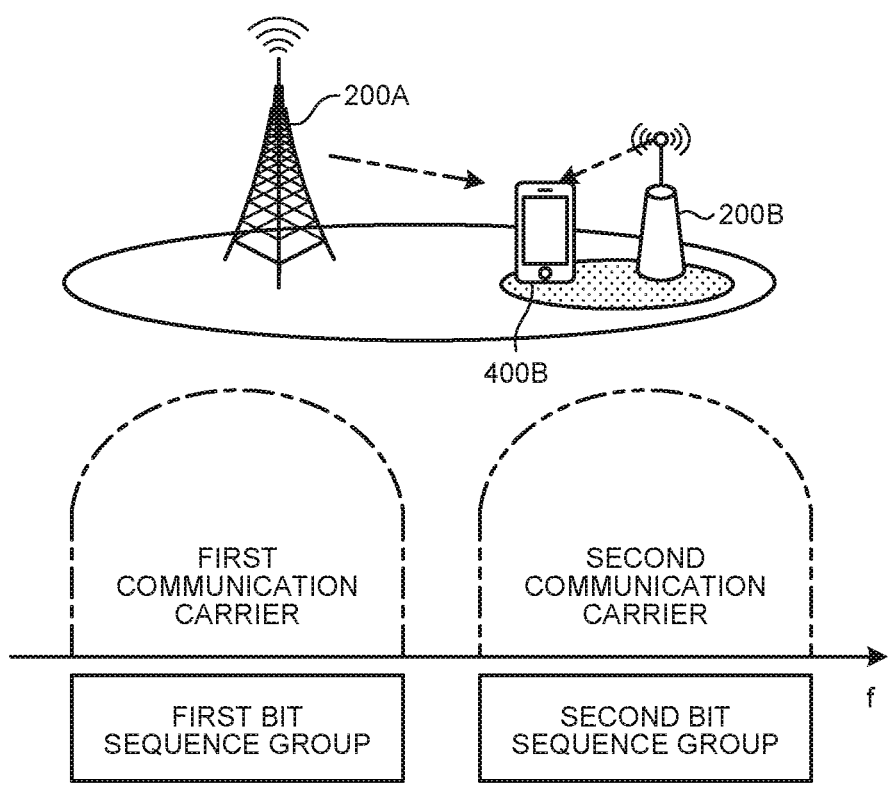
FIG. 13 is a diagram for explaining another example of a communication method according to an embodiment of the present disclosure.
Figure 14:
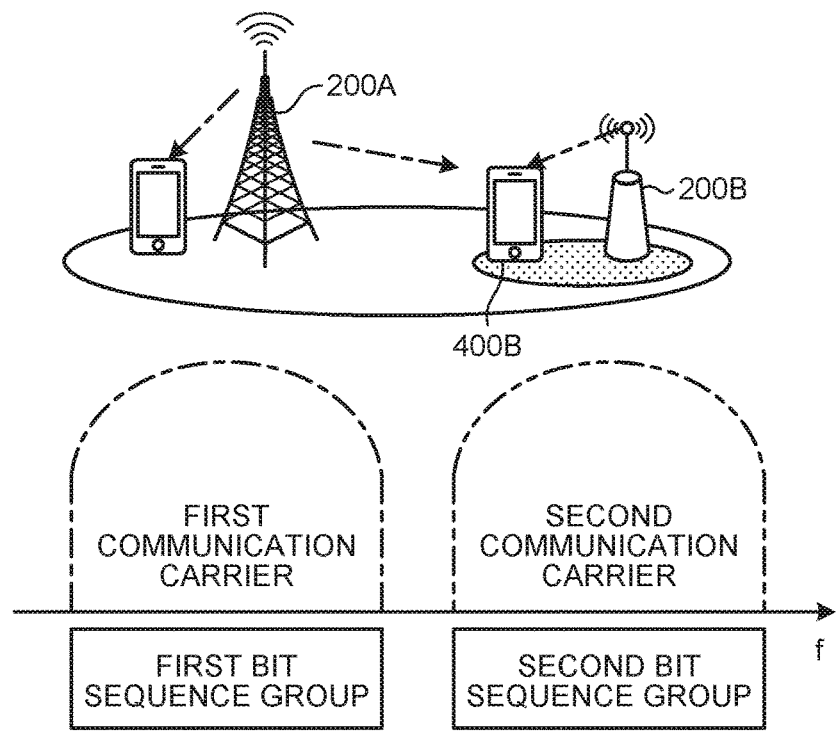
FIG. 14 is a diagram for explaining another example of a communication method according to an embodiment of the present disclosure.

FIGS. 13 and 14 are diagrams each for explaining another example of a communication method according to an embodiment of the present disclosure. As illustrated in FIG. 13, the first and second base station devices 200A and 200B may transmit signals through different communication carriers.

In the example of FIG. 13, the first base station device 200A transmits a first transmission signal including a first bit sequence group BS1 to the second terminal device 400B using a first communication carrier.

In addition, the second base station device 200B transmits a second transmission signal including a second bit sequence group BS2 to the second terminal device 400B using a second communication carrier different from the first communication carrier.

In this case, as illustrated in FIG. 14, the first base station device 200A transmits the first transmission signal including the first bit sequence group BS1 to the first terminal device 400A using the first communication carrier.

In this way, the first and second base station devices 200A and 200B can transmit transmission signals through the different communication carriers.

(Transmission from One Base Station Device)

Figure 15:
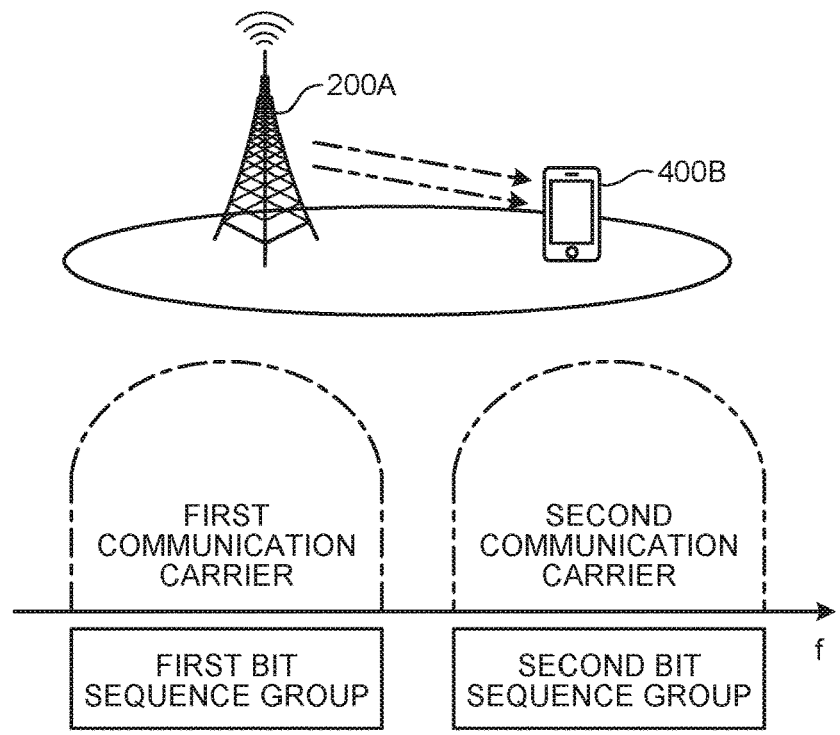
FIG. 15 is a diagram for explaining another example of a communication method according to an embodiment of the present disclosure.

Although it has been described in the above-described example that the first and second transmission signals are transmitted from the plurality of base station devices 200, the present invention is not limited thereto. The first and second transmission signals may be transmitted from one base station device 200. A communication method in such a case will be described with reference to FIG. 15. FIG. 15 is a diagram for explaining another example of a communication method according to an embodiment of the present disclosure.

As illustrated in FIG. 15, the first base station device 200A transmits a first transmission signal to the second terminal device 400B using a first communication carrier, and transmits a second transmission signal to the second terminal device 400B using a second communication carrier.

A channel between the first base station device 200A and the second terminal device 400B is in a different condition for each communication carrier. Therefore, the first base station device 200A transmits the first transmission signal and the second transmission signal to the second terminal device 400B through the different communication carriers.

Even when the second terminal device 400B has failed to receive the first transmission signal due to the poor channel condition of the first communication carrier, the second terminal device 400B can perform error correction using the second transmission signal, thereby making it possible to further reduce the number of times the data sequence is retransmitted.

In the communication method described above, the base station device 200 transmits the first and second transmission signals through the first and second communication carriers, respectively, but the present invention is not limited thereto. For example, the base station device 200 may transmit the first and second transmission signals using different radio resources such as different band width parts (BWPs). For example, the first base station device 200A transmits the first transmission signal in a first BWP, and the second base station device 200B (or the first base station device 200A) transmits the second transmission signal in a second BWP.

Furthermore, in the communication method described above as an example, the base station device 200 mainly transmits signals in broadcast or multicast, but the present invention is not limited thereto. When the base station device 200 performs unicast communication with the terminal device 400, the communication can be performed by a similar method.

Figure 16:
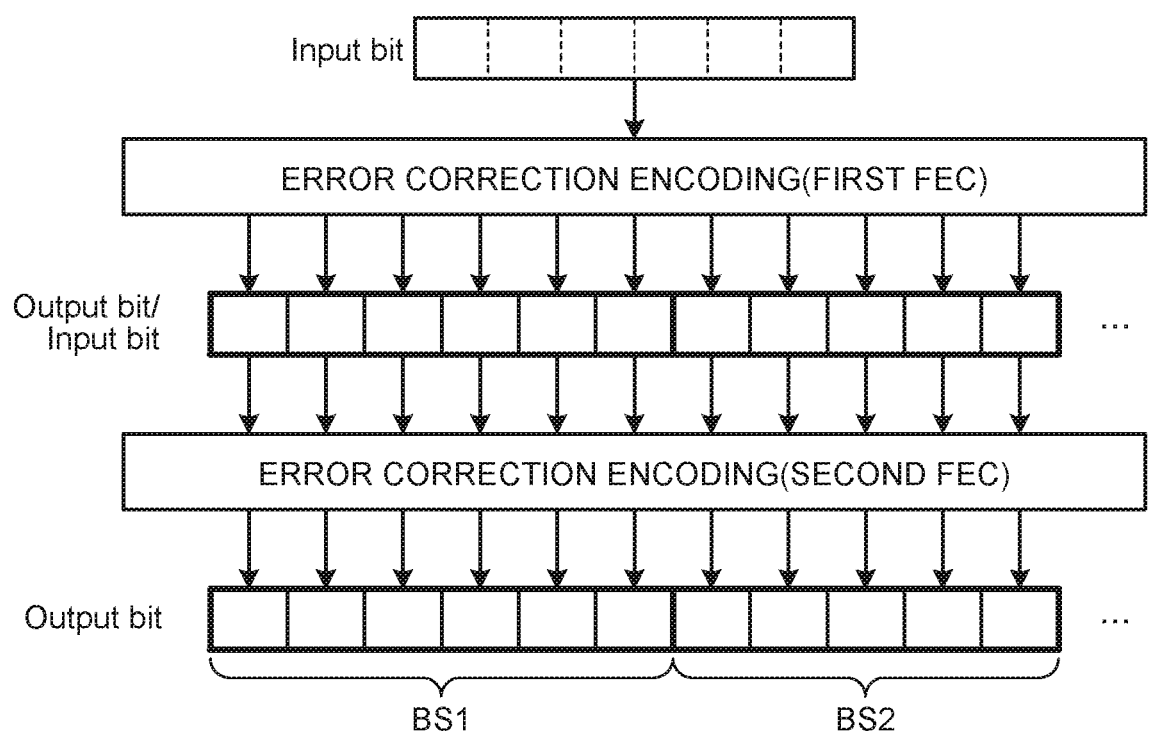
FIG. 16 is a diagram for explaining another example of a communication method according to an embodiment of the present disclosure.

Furthermore, in the communication method described above, the base station device 200 performs the first FEC encoding, but the present invention is not limited thereto. For example, the base station device 200 may perform second encoding in addition to the first FEC encoding. This will be described with reference to FIG. 16. FIG. 16 is a diagram for explaining another example of a communication method according to an embodiment of the present disclosure.

As illustrated in FIG. 16, the base station device 200 performs the first FEC encoding on a data sequence (input bits) to be transmitted to obtain a plurality of bit sequences as output bits. The plurality of bit sequences includes a bit sequence group to be necessarily transmitted and a bit sequence group that does not need to be transmitted in enabling decoding.

The base station device 200 performs the second FEC encoding on each of the plurality of bit sequences. As a result, the base station device 200 obtains a plurality of bit sequences on which the second FEC encoding is performed. The plurality of bit sequences includes a bit sequence group obtained by performing the second FEC encoding on a bit sequence group to be necessarily transmitted, and a bit sequence group obtained by performing the second FEC encoding on a bit sequence group that does not need to be transmitted in enabling decoding.

The base station device 200 generates a first transmission signal by using the bit sequence group obtained by performing the second FEC encoding on the bit sequence group to be necessarily transmitted as a first bit sequence group. In addition, the base station device 200 generates a second transmission signal by using the bit sequence group obtained by performing the second FEC encoding on the bit sequence group that does not need to be transmitted in enabling decoding as a second bit sequence group.

When the second FEC is performed as described above, the base station device 200 can transmit the first and second transmission signals through different propagation paths in a similar manner.

(Signaling)

The base station device 200 notifies the terminal device 400 of whether to transmit a first transmission signal or transmit a first transmission signal and a second transmission signal. Such notifications include, for example, quasi-static notifications periodically transmitted by the base station device 200 and dynamic notifications transmitted when the first and second transmission signals are transmitted.

The quasi-static notification includes, for example, the following information.

Notification indicating that first FEC is to be performed

Type of first FEC

Length of a bit sequence group whether ACK/NACK is to be performed to an upper layer Here, the information regarding the type of first FEC includes information for identifying an error correction code to be actually executed by the base station device 200 among the error correction codes applicable as first FEC codes illustrated in Table 1 described above.

Furthermore, the information regarding the length of the bit sequence group includes, for example, a length of the first bit sequence group and a length of the second bit sequence group.

In addition, the information regarding whether ACK/NACK is to be performed to an upper layer includes information indicating whether ACK/NACK is to be performed for the first and second transmission signals. For example, using this information, the base station device 200 notifies that ACK/NACK is to be performed for the first transmission signal but ACK/NACK is not to be performed for the second transmission signal.

The dynamic notification includes, for example, the following information.

Notification indicating that first FEC is to be performed

Packet combination information

Packet type information

Packet order information

For example, even in a case where it is notified that the first FEC is to be performed as quasi-static notification, the base station device 200 notifies whether to perform the first FEC using dynamic notification, for example, in order to switch whether to perform the first FEC for each packet.

In addition, the packet combination information includes information indicating which packets among the packets transmitted through different propagation paths are to be combined and decoded. By referring to this information, the second terminal device 400B can combine the first transmission signal and the second transmission signal and decode the combined transmission signal.

The pack type information includes information indicating whether the packet to be transmitted is a packet included in the first transmission signal or a packet included in the second transmission signal. By referring to this information, the second terminal device 400B can determine whether or not the received packet is a packet on which the first FEC decoding processing is to be performed.

The packet order information includes information indicating the order in which packets to be transmitted are to be combined. On the basis of this order information, the second terminal device 400B arranges the received packets and combines the packets.

Note that, although the notification from the base station device 200 to the terminal device 400 has been described hereinabove, the information may be notified from the terminal device 400 to the base station device 200. For example, the terminal device 400 transmits capability information related to the first FEC including whether to perform the first FEC to the base station device 200 as a quasi-static notification.

On the basis of the capability information, the base station device 200 determines whether to perform the first FEC.

(Determination of Transmission Signal)

The base station device 200 determines whether to transmit only a first transmission signal or both a first transmission signal and a second transmission signal depending on what the terminal device 400 is. In the present embodiment, such determination is performed by the determination unit 231 of the control unit 23 of the base station device 200.

(Condition of Channel)

The determination unit 231 determines whether to transmit only a first transmission signal or both a first transmission signal and a second transmission signal depending on a condition of a channel between the base station device 200 and the terminal device 400. For example, the determination unit 231 determines whether to transmit only a first transmission signal or both a first transmission signal and a second transmission signal on the basis of CQI notified from the terminal device 400.

Alternatively, the determination unit 231 determines whether to transmit only a first transmission signal or both a first transmission signal and a second transmission signal on the basis of information about a position of the terminal device 400.

For example, on the basis of the information about the position of the terminal device 400, the determination unit 231 determines to transmit both first and second transmission signals when the base station device 200 and the terminal device 400 are positioned away from each other by a predetermined distance or more, and determines to transmit only a first transmission signal when the base station device 200 and the terminal device 400 are positioned away from each other by less than the predetermined distance.

In this way, the determination unit 231 estimates a condition of a channel between the base station device 200 and the terminal device 400, and switches a signal to be transmitted according to an estimation result.

(QoS Level)

The determination unit 231 determines whether to transmit only a first transmission signal or both a first transmission signal and a second transmission signal depending on communication quality required for a signal to be transmitted. For example, the determination unit 231 determines to transmit both a first transmission signal and a second transmission signal when a value of QoS (e.g., 5G QoS identifier (5QI)) is a predetermined value, and determines to transmit only a first transmission signal when a value of QoS is not the predetermined value.

Note that, in addition to the above-described 5QI value, the determination unit 231 may switch a signal to be transmitted, for example, depending on a requested packet error rate or an allowable delay time. For example, the determination unit 231 determines to transmit both a first transmission signal and a second transmission signal when the requested packet error rate is lower than a predetermined value, and determines to transmit only a first transmission signal when the requested packet error rate is equal to or higher than the predetermined value. Alternatively, the determination unit 231 determines to transmit both a first transmission signal and a second transmission signal when the allowable delay time is equal to or longer than a predetermined time, and determines to transmit only a first transmission signal when the allowable delay time is shorter than the predetermined time.

In this way, the determination unit 231 switches a signal to be transmitted depending on communication quality required for communication.

(Data Replication)

The determination unit 231 determines whether to transmit only a first transmission signal or both a first transmission signal and a second transmission signal depending on whether to replicate a transmission data sequence. For example, in a mode in which a transmission data sequence is replicated, the determination unit 231 determines to transmit both a first transmission signal and a second transmission signal. The replication of the transmission data sequence is performed, for example, in the PDCP layer (see FIG. 6) in the above-described example, but may be performed in a layer other than the PDCP layer.

In the mode in which a transmission data sequence is replicated, it is expected that the transmission data sequence may be transmitted with high reliability. Therefore, in an embodiment of the present disclosure, in order to further improve reliability, the base station device 200 performs first FEC on a transmission data sequence in addition to the replication of the transmission data sequence. By performing the first FEC together with the data replication as described above, the base station device 200 is capable of achieving more highly reliable communication.

Note that the base station device 200 may perform, after replicating transmission data sequences, first FEC on at least one of the replicated transmission data sequences, or may replicate at least one of a plurality of bit sequences obtained by performing the first FEC.

Note that, since reliability of communication can be improved by performing first FEC, even in the mode in which a transmission data sequence is replicated, the base station device 200 may omit the replication of the transmission data sequence, by performing the first FEC.

In this case, the base station device 200 performs first FEC without replicating the transmission data sequence. The base station device 200 transmits a first bit sequence group BS1 and a second bit sequence group BS2 obtained by performing the first FEC through different links, respectively.

By omitting replication as described above, the base station device 200 is capable of reducing a signal processing amount.

(ARQ Processing)

The determination unit 231 switches a signal to be transmitted according to retransmission processing. For example, in a mode in which ARQ processing is performed as retransmission processing (e.g., an acknowledged mode (AM) in the RLC layer), the determination unit 231 determines to transmit both a first transmission signal and a second transmission signal.

In a case where retransmission is performed by ARQ processing, the base station device 200 usually transmits a packet that is identical to a packet that the reception side has failed to receive.

Meanwhile, the base station device 200 according to the present embodiment transmits a first transmission signal as an initial transmission packet and transmits a second transmission signal as a retransmission packet.

In this way, the base station device 200 transmits a second transmission signal including a second bit sequence group as a retransmission packet, such that the reception side can perform first error correction decoding processing using the initial transmission packet and the second bit sequence group.

As a result, the base station device 200 is capable of further improving reliability of packet transmission and suppressing an increase in communication volume.

(NACK Signal)

The determination unit 231 switches a signal to be transmitted depending on whether or not a data sequence to be transmitted is a retransmission packet.

The base station device 200 according to the present embodiment transmits a first transmission signal as an initial transmission packet and transmits a second transmission signal as a retransmission packet.

In this way, the base station device 200 transmits a second transmission signal including a second bit sequence group as a retransmission packet, such that the reception side can perform first error correction decoding processing using the initial transmission packet and the second bit sequence group.

As a result, the base station device 200 is capable of further improving reliability of packet transmission and suppressing an increase in communication volume.

(Timeout)

The determination unit 231 may determine to transmit both a first transmission signal and a second transmission signal in a case where there is no response from the reception side for a certain period of time. In a case where there is no response from the reception side for a certain period of time, there is a possibility, for example, that the reception side has failed to receive control information for receiving an initial transmission packet. Alternatively, there is a possibility that the base station device 200 has failed to receive ACK/NACK from the reception side.

Therefore, the determination unit 231 determines to transmit both a first transmission signal and a second transmission signal, for example, in a case where there is no response for a certain period of time after the initial transmission packet is transmitted.

As a result, the base station device 200 is capable of more reliably transmitting a transmission signal to the terminal device 400.

(Capability of Reception Side)

The determination unit 231 switches a signal to be transmitted depending on the capability of the reception side (e.g., the terminal device 400). For example, the determination unit 231 determines to transmit both a first transmission signal and a second transmission signal, when the terminal device 400 supports the first FEC, in other words, when the terminal device 400 is capable of decoding the first transmission signal on which the first FEC has been performed.

On the other hand, the determination unit 231 determines to transmit only a first transmission signal, when the terminal device 400 does not support the first FEC, in other words, when the terminal device 400 is not capable of synthesizing a first transmission signal and a second transmission signal and decoding the synthesized transmission signal.

Note that the base station device 200 is notified of whether or not the terminal device 400 supports the first FEC from the terminal device 400 as information on the capability of the terminal device 400 as described above.

The base station device 200 determines whether to transmit a second transmission signal on the basis of the information on the capability of the terminal device 400, and notifies the terminal device 400 of a determination result.

When the terminal device 400 (or the base station device 200) does not support the first FEC, the base station device 200 transmits, to the terminal device 400, a notification indicating that a second transmission signal is not transmitted.

On the other hand, when the terminal device 400 and the base station device 200 support the first FEC, the base station device 200 determines whether to transmit a second transmission signal, and notifies the terminal device 400 of a determination result.

Note that, when a second transmission signal is not transmitted, the base station device 200 may omit a notification. That is, when there is no notification from the base station device 200, the terminal device 400 determines that a second transmission signal is not transmitted.

(Carrier Aggregation)

The determination unit 231 determines to transmit a second transmission signal when carrier aggregation (CA) is valid. In this case, the base station device 200 transmits the first transmission signal and the second transmission signal through different carriers.

(Dual Connectivity)

The determination unit 231 determines to transmit a second transmission signal when dual connectivity (carrier aggregation (CA)) is valid. In this case, the base station device 200 transmits a first transmission signal and a second transmission signal through different links. That is, the first base station device 200A transmits a first transmission signal, and the second base station device 200B transmits a second transmission signal.

(BWP)

The determination unit 231 determines to transmit a second transmission signal when transmission can be performed using a plurality of BWPs simultaneously. In this case, the base station device 200 transmits a first transmission signal and a second transmission signal using different BWPs. That is, the base station device 200 transmits a first transmission signal using a first BWP, and transmits a second transmission signal using a second BWP.

Alternatively, the determination unit 231 may determine whether to transmit a second transmission signal depending on what BWP is used. In this case, the base station device 200 transmits a first transmission signal when using the first BWP, and transmits a second transmission signal when using the second BWP.

(Channel)

The determination unit 231 determines whether to transmit a second transmission signal depending on a channel. The channel includes a logical channel, a transport channel, a physical channel, or the like.

[Logical Channel]

The determination unit 231 determines to transmit or receive a second transmission signal as well when the signal is transmitted or received through a predetermined logical channel, and determines not to transmit or receive a second transmission signal when the signal is transmitted or received through a logical channel other than the predetermined logical channel.

For example, the determination unit 231 may transmit or receive a second transmission signal obtained by performing the first FEC on a signal to be transmitted or received through a data channel such as BCCH, PCCH, CCCH, DCCH, or DTCH.

For example, the determination unit 231 generates first and second transmission signals by performing the first FEC on a signal to be transmitted or received through the DTCH, and transmits the generated first and second transmission signals. The determination unit 231 determines not to perform the first FEC on a signal to be transmitted or received through a logical channel other than the DTCH, or determines to transmit or receive a first transmission signal obtained by performing the first FEC on a signal to be transmitted or received through a logical channel other than the DTCH.

Alternatively, in a case where a signal is to be transmitted through a control logical channel, the determination unit 231 may determine to transmit or receive a second transmission signal as well.

[Transport Channel]

The determination unit 231 determines to transmit or receive a second transmission signal as well when the signal is transmitted through a predetermined transport channel, and determines not to transmit or receive a second transmission signal when the signal is transmitted through a transport channel other than the predetermined transport channel.

For example, the determination unit 231 may determine to transmit or receive a second transmission signal obtained by performing the first FEC on a signal to be transmitted or received through a data channel such as BCH, DL-SCH, UL-SCH, or PCH.

For example, the determination unit 231 determines to transmit or receive both first and second transmission signals obtained by performing the first FEC on a signal to be transmitted or received through the DL-SCH or the UL-SCH. The determination unit 231 determines not to perform the first FEC on a signal to be transmitted or received through a transport channel other than the DL-SCH or the UL-SCH, or determines to transmit or receive a first transmission signal obtained by performing the first FEC on a signal to be transmitted or received through a transport channel other than the DL-SCH or the UL-SCH.

[Physical Channel]

The determination unit 231 determines to transmit or receive a second transmission signal as well when the signal is transmitted through a predetermined physical channel, and determines not to transmit or receive a second transmission signal when the signal is transmitted through a physical channel other than the predetermined physical channel.

For example, the determination unit 231 may determine to transmit or receive a second transmission signal obtained by performing the first FEC on a signal to be transmitted or received through a data channel such as PBCH, PDCCH, PUCCH, PSCCH, PDSCH, PUSCH, PSSCH, or PRACH.

For example, the determination unit 231 determines to transmit or receive both first and second transmission signals obtained by performing the first FEC on a signal to be transmitted or received through the PDSCH, the PUSCH, or the PSSCH. The determination unit 231 determines not to perform the first FEC on a signal to be transmitted or received through a physical channel other than the PDSCH, the PUSCH, or the PSSCH, or determines to transmit or receive a first transmission signal obtained by performing the first FEC on a signal to be transmitted or received through a physical channel other than the PDSCH, the PUSCH, or the PSSCH.

(Configured Grant Transmission)

The determination unit 231 determines to transmit a second transmission signal as well when uplink or sidelink communication (e.g., configured grant or the like) is performed using control information quasi-statically notified in advance.

For example, in the configured grant, communication is performed using control information notified quasi-statically. The communication using the control information notified quasi-statically may be inferior in channel state trackability compared to a case where the control information is notified dynamically. In this case, uplink or sidelink transmission is performed using a non-optimal transmission parameter, and thus, it is highly likely that communication may fail.

At this point, in the present embodiment, the determination unit 231 determines to transmit a second transmission signal as well for uplink or sidelink communication performed using control information that is quasi-statically notified in advance. As a result, even though communication is performed using a non-optimal transmission parameter, an error can be corrected by first FEC, thereby making it possible to perform the communication more reliably.

(Initial Access)

The determination unit 231 may determine to transmit a second transmission signal as well when data is transmitted at the time of initial access.

When data is transmitted at the time of initial access, the transmission side may transmit data using a transmission parameter notified quasi-statically in advance. The communication using the control information notified quasi-statically may be inferior in channel state trackability compared to a case where the control information is notified dynamically. In this case, data is transmitted using a non-optimal transmission parameter, and thus, it is highly likely that communication may fail.

At this point, in the present embodiment, the determination unit 231 determines to transmit a second transmission signal as well when data is transmitted at the time of initial access. As a result, even though communication is performed using a non-optimal transmission parameter, an error can be corrected by first FEC, thereby making it possible to perform the communication more reliably.

For example, the determination unit 231 determines to transmit a second transmission signal as well in the case of 2-step RACH, and determines not to transmit a second transmission signal in the case of 4-step RACH. Alternatively, even in the case of 2-step RACH, the determination unit 231 may determine whether to transmit a second transmission signal in a switchable manner.

(RRC State)

The determination unit 231 may determine whether to transmit a second transmission signal depending on a state transition of the radio resource control (RRC) of the terminal device 400.

The determination unit 231 determines to transmit a second transmission signal as well when the RRC state transitions to RRC-Connected. Examples of cases where the RRC state transitions to the RRC-Connected include a case where the RRC state transitions from RRC-Inactive to RRC-Connected and a case where the RRC state transitions from RRC-Idle to RRC-Connected. RRC-Inactive and RRC-Idle are also collectively referred to as an unconnected state.

When the terminal device 400 transmits data from the unconnected state, data may be transmitted using a transmission parameter quasi-statically notified in advance. The communication using the control information notified quasi-statically may be inferior in channel state trackability compared to a case where the control information is notified dynamically. In this case, data is transmitted using a non-optimal transmission parameter, and thus, it is highly likely that communication may fail.

At this point, in the present embodiment, the determination unit 231 determines to transmit a second transmission signal as well when data is transmitted from the RRC-unconnected state. As a result, even though communication is performed using a non-optimal transmission parameter, an error can be corrected by first FEC, thereby making it possible to perform the communication more reliably.

(Multiple Transmission Targets)

The determination unit 231 may determine to transmit a second transmission signal as well when a transmission data sequence is transmitted to a plurality of destinations.

The determination unit 231 determines to transmit a second transmission signal as well, for example, when data is transmitted in broadcast or multicast.

When data is transmitted in broadcast or multicast, the data may be transmitted to a plurality of terminal devices 400 using the same transmission parameter. Therefore, there may be a terminal device 400 to which the data is not transmitted using an appropriate transmission parameter, and it is highly likely that communication may fail.

At this point, in the present embodiment, the determination unit 231 determines to transmit a second transmission signal as well when data is transmitted in broadcast or multicast. As a result, even in a terminal device 400 to which data is transmitted using a non-optimal transmission parameter, an error can be corrected by first FEC, thereby making it possible to perform communication more reliably.

Note that it has been described hereinabove, unless otherwise specified, that the determination unit 231 determines whether to perform first FEC for a case in which the base station device 200 transmits a data sequence (for the downlink), but the present invention is not limited thereto. Similarly to downlink communication, the determination unit 231 may determine whether to perform first FEC for the uplink or the sidelink communication.

(Change of Signal Processing)

When the determination unit 231 determines to transmit a second transmission signal as well, the base station device 200 may partially change signal processing performed after the first FEC. Here, the description will be made for a case in which the base station device 200 performs transmission. However, in a case where the terminal device 400 performs transmission as well, the terminal device 400 can partially change signal processing in a similar manner.

[Second FEC Processing]

When the determination unit 231 determines to transmit a second transmission signal as well, the base station device 200 may partially change second FEC processing.

When the first FEC is performed, the base station device 200 changes second FEC so that the processing amount becomes smaller. Alternatively, the base station device 200 changes a parameter for performing second FEC to another parameter requiring a smaller processing amount. For example, the base station device 300 switches a coding scheme table (e.g., an LDCP code matrix table) for second FEC.

By performing the first FEC, the base station device 200 can perform more highly reliable communication, but signal processing due to error correction increases. At this point, second FEC processing is changed to reduce a second FEC processing amount. As a result, it is possible to suppress an increase in signal processing amount in the base station device 200 (or the reception side) while securing a certain degree of reliability.

Note that it has been described hereinabove that the second FEC processing is changed, but the present invention is not limited thereto. When the first FEC is performed, the base station device 200 may omit the second FEC processing. By performing the first FEC even if the second FEC is omitted as described above, it is possible to suppress an increase in signal processing amount in the base station device 200 (or the reception side) while securing reliability.

[Signal Processing in PHY Layer]

When the determination unit 231 determines to transmit a second transmission signal as well, the base station device 200 may partially change signal processing in the PHY layer. The signal processing in the PHY layer includes processing other than the second FEC processing.

For example, when the first FEC is performed, the base station device 200 switches a modulation scheme table (MCS). Alternatively, when the first FEC is performed, the base station device 200 may switch a channel quality information table.

By performing the first FEC, the base station device 200 can perform more highly reliable communication, but signal processing due to error correction increases. At this point, the signal processing in the PHY layer is changed to reduce the signal processing in the PHY layer. As a result, it is possible to suppress an increase in signal processing amount in the base station device 200 (or the reception side) while securing high reliability.

The signal processing in the PHY layer may include various types of signal processing as well as what has been described above, such as error correction other than the second FEC, scrambling, layer mapping, precoding, resource mapping, and OFDM processing.

4. Communication Processing

Next, communication processing in the system according to an embodiment of the present disclosure will be described.

<4.1. Downlink Communication Processing 1>

Figure 17:
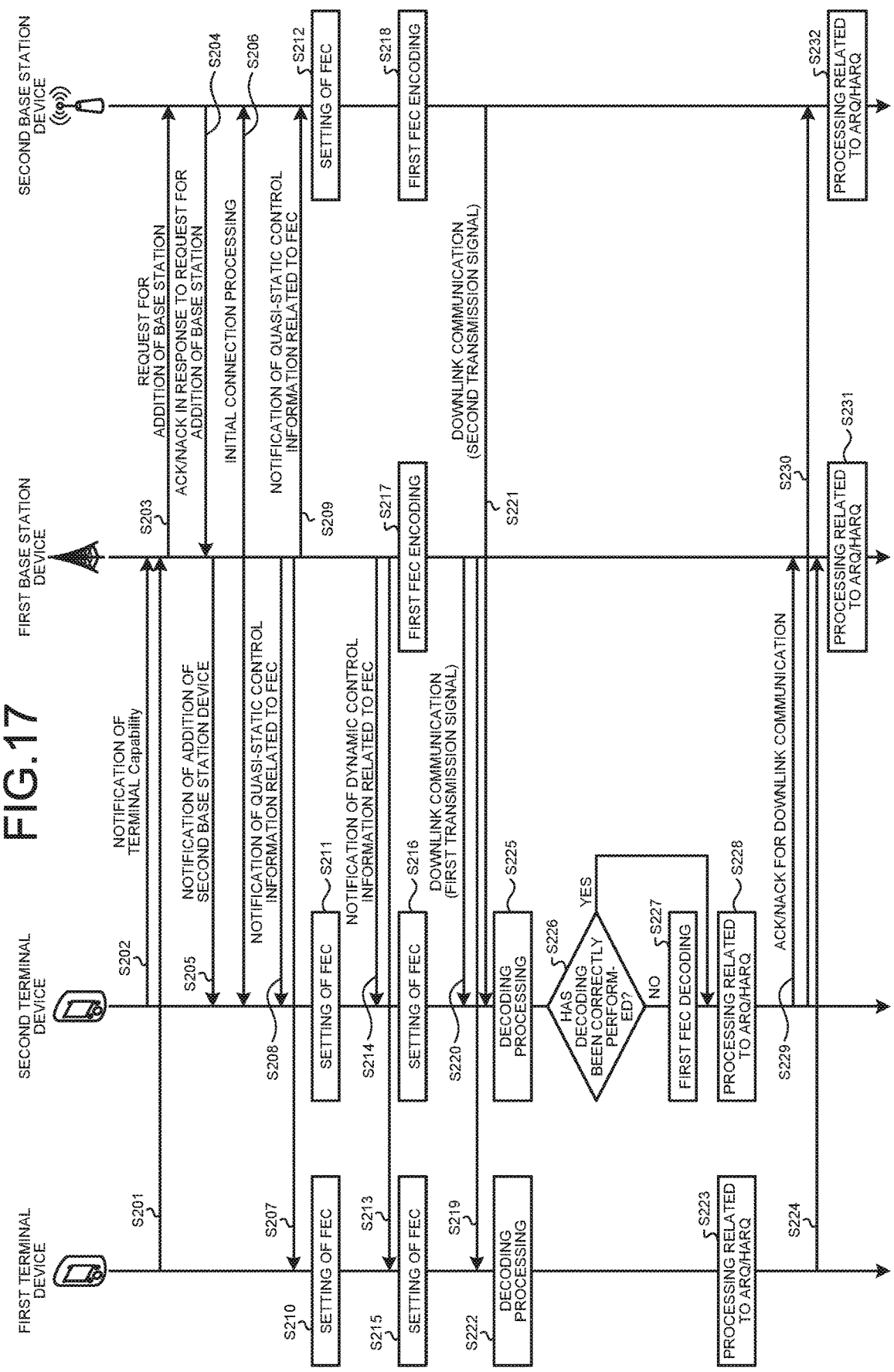
FIG. 17 is a sequence diagram illustrating an example of downlink communication processing according to an embodiment of the present disclosure.

FIG. 17 is a sequence diagram illustrating an example of downlink communication processing according to an embodiment of the present disclosure. In the downlink communication, the base station device 200 serves as a transmission side (transmission device), and the terminal device 400 serves as a reception side (reception device). In this case, it is preferable that the transmission device (base station device 200) notifies the reception device (terminal device 400) of whether to perform the first FEC and a specific configuration parameter.

Here, the description will be made for a case in which the first base station device 200A transmits a first transmission signal to the first and second terminal devices 400A and 400B, and the second base station device 200B transmits a second transmission signal to the second terminal device 400B. That is, it is assumed that the first terminal device 400A does not perform the first FEC, and the second terminal device 400B performs the first FEC.

As illustrated in FIG. 17, the first and second terminal devices 400A and 400B notify the first base station device 200A of the cell 20A to which the first and second terminal devices 400A and 400B themselves are connected of information regarding the terminal capability of the first and second terminal devices 400A and 400B (Steps S201 and S202). The information also includes information regarding the capability of the first FEC. The information regarding the terminal capability is notified during the initial access or after the initial access.

As a physical channel for the notification, at least one of a physical random access channel (PRACH), a physical uplink control channel (PUCCH), and a physical uplink shared channel (PUSCH) is used.

When it is determined to transmit a second transmission signal to the second terminal device 400B, the first base station device 200A requests the second base station device 200B to add a base station device (Step S203). The second base station device 200B transmits ACK/NACK in response to the request (Step S204). Here, it is assumed that the second base station device 200B sends ACK as a response.

The first base station device 200A notifies the second terminal device 400B connected to the cell 20A managed by itself that the second base station device 200B has been added (Step S205). The second terminal device 400B that has received the notification performs processing of initial connection to the second base station device 200B (Step S206).

Next, the first base station device 200A notifies the first and second terminal devices 400A and 400B connected to the cell 20A managed by the first base station device 200A of quasi-static control information related to the first FEC (Steps S207 and S208). The quasi-static control information may also be notified to the second base station device 200B (Step S209).

The quasi-static control information may be cell-specific control information. The control information is notified during the initial access or after the initial access. Alternatively, the control information may be notified as a part of an RRC procedure, such as RRC signaling, RRC configuration, or RRC reconfiguration. Alternatively, the control information may be periodically notified from the first base station device 200A to at least one of the first and second terminal devices 400A and 400B and the second base station device 200B.

As a physical channel for notifying the control information, at least one of a physical broadcast channel (PBCH), a physical downlink control channel or an enhanced physical downlink control channel (EPDCCH), and a physical downlink shared channel is used.

Receiving the quasi-static control information, the first and second terminal devices 400A and 400B and the second base station device 200B set the first FEC on the basis of the control information (Steps S210, S211, and S212).

Note that since the first terminal device 400A does not perform the first FEC, the first terminal device 400A may not receive the quasi-static control information or may not set the first FEC. In addition, in a case where the first and second terminal devices 400A and 400B perform the second FEC, the quasi-static control information may include information related to the second FEC.

Thereafter, it is assumed that downlink communication occurs from the first base station device 200A to the first and second terminal devices 400A and 400B. More specifically, it is assumed that downlink communication occurs, for example, because at least one of the first and second terminal devices 400A and 400B has requested data downloading (pulling) or push data is generated to the first and second terminal devices 400A and 400B.

In this case, the first base station device 200A notifies the first and second terminal devices 400A and 400B of control information (dynamic control information) such as radio resources used for downlink communication from the first base station device 200A (Steps S213 and S214).

The dynamic control information may be UE-specific control information for each of the first and second terminal devices 400A and 400B or UE-group-specific control information for each terminal group. Here, the terminal group is, for example, a group of one or more terminal devices 400 which are transmission destination targets in a case where the downlink communication is performed in multicast or broadcast.

Furthermore, the dynamic control information includes information regarding the following resources for allocating downlink communication to the target terminal device 400 (or terminal group).
Frequency resource
Time resource
Spatial resource Examples of the frequency resource include a resource block, a subcarrier, and a subcarrier group.

In addition, examples of the time resource include a subframe, a slot, a mini-slot, and a symbol.

In addition, examples of the spatial resource include an antenna, an antenna port, a spatial layer, and a spatial stream.

The dynamic control information includes the following information.

Non-orthogonal resources (resources related to power and interleave pattern) for non-orthogonal multiple access (NOMA), multiuser superposition transmission (MUST), interleave division multiple access (IDMA), and codo division multiple access (CDMA).

Information regarding a modulation level and an FEC coding rate of a lower layer (physical layer) (modulation and coding set (MCS))

Information regarding a coding method and a coding rate of first FEC

ARQ/HARQ settings (new data indicator (NDI), redundancy version (RV), and the like)

Receiving the dynamic control information, the first and second terminal devices 400A and 400B perform settings for appropriately receiving downlink communication, including settings for the first FEC, on the basis of the control information (Steps S215 and S216).

Note that the dynamic control information for the first terminal device 400A, which does not perform the first FEC, may not include information related to the first FEC. In addition, in a case where the first and second terminal devices 400A and 400B perform the second FEC, the dynamic control information may include information related to the second FEC (e.g., information regarding a second FEC coding method and a second FEC coding rate). Furthermore, the first base station device 200A may notify the second base station device 200B of the dynamic control information.

The first and second base station devices 200A and 200B perform encoding and modulation on downlink communication data to be transmitted to the first and second terminal devices 400A and 400B to match the control information notified to the first and second terminal devices 400A and 400B. Here, the base station devices 200 perform encoding and modulation including the first FEC encoding (Steps S217 and S218) to generate a first transmission signal and a second transmission signal.

The first base station device 200A transmits a first transmission signal to the first and second terminal devices 400A and 400B as downlink communication (Steps S219 and S220). The first transmission signal is the same as a signal obtained by performing encoding and modulation without applying the first FEC to the data sequence to be transmitted, and can be decoded without performing the first FEC decoding.

In addition, the second base station device 200B transmits a second transmission signal to the second terminal device 400B as downlink communication (Step S221). The second transmission signal is a part of a signal obtained by performing encoding and modulation processing including the first FEC encoding on the data sequence to be transmitted, and is used for the first FEC decoding processing.

Receiving the first transmission signal, the first terminal device 400A receives, demodulates, and decodes the first transmission signal in a lower layer and an upper layer according to the settings specified in the control information (Step S222).

The first terminal device 400A performs ARQ/HARQ processing depending on whether the decoding of the data has succeeded or failed (Step S223). Specifically, the first terminal device 400A sends ACK or NACK to the first base station device 200A as a response depending on whether the decoding of the data has succeeded or failed (Step S224). In addition, it is preferable that first terminal device 400A differently set ARQ/HARQ processing depending on whether the decoding of the data has succeeded or failed. For example, when the decoding has failed, it is preferable that the first terminal device 400A stores a decoding result or data in the middle of decoding (a soft determination value, a log likelihood ratio (LLR), etc.) in a memory in order to perform retransmission and synthesis for a next HARQ.

Receiving the first and second transmission signals, the second terminal device 400B receives, demodulates, and decodes the received signals in a lower layer and an upper layer according to the settings specified in the control information. At this time, the second terminal device 400B may decode the first and second transmission signals in a combined state or may decode the first and second transmission signals in a non-combined state.

In the example of FIG. 17, the second terminal device 400B performs demodulation and decoding processing not including the first FEC decoding processing on the first transmission signal (Step S225). Next, the second terminal device 400B determines whether or not the demodulation and decoding processing has been correctly performed (Step S226).

When the demodulation and decoding processing has been correctly performed (Yes in Step S226), that is, when the decoding of the data has succeeded, the process proceeds to Step S228.

When the demodulation and decoding processing has not been correctly performed (No in Step S226), that is, when the decoding of the data has failed, the second terminal device 400B synthesizes the first transmission signal and the second transmission signal, and performs demodulation and decoding processing including the first FEC decoding (Step S227).

The second terminal device 400B performs ARQ/HARQ processing depending on whether the decoding of the data has succeeded or failed (Step S228). Specifically, the first terminal device 400A sends ACK or NACK to the first and second base station devices 200A and 200B as a response depending on whether the decoding of the data has succeeded or failed (Steps S229 and S230). Note that the ARQ/HARQ processing performed here is the same as the processing of Step S223.

According to ACK/NACK received from the first and second terminal devices 400A and 400B, the first base station device 200A performs ARQ/HARQ processing (Step S231). In addition, according to ACK/NACK received from the second terminal device 400B, the second base station device 200B performs ARQ/HARQ processing (Step S232).

The base station device 200 executes subsequent processing that needs to be performed according to ACK/NACK received from the terminal device 400. When NACK is notified, the base station device 200 performs preparation for retransmission according to ARQ/HARQ. The preparation for retransmission may include selecting an RV, select-ing an MCS, selecting a radio resource, setting first FEC, setting second FEC, and the like. When ACK is received from the terminal device 400, this means that the target data can be transmitted and received without any problem, and thus, the base station device 200 shifts to next communication of new data.

<4.2. Downlink Communication Processing 2>

Figure 18:
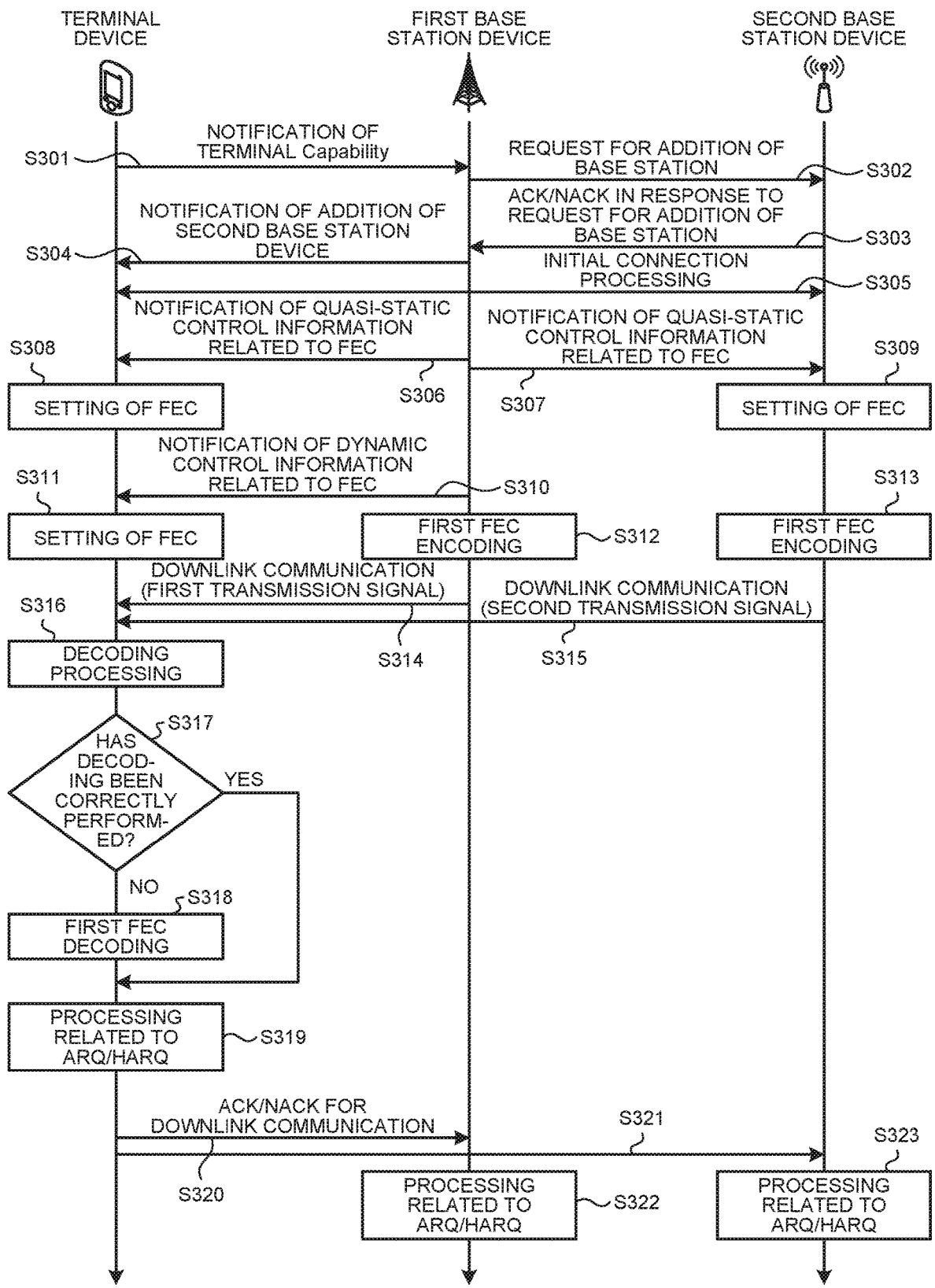
FIG. 18 is a sequence diagram illustrating another example of downlink communication processing according to an embodiment of the present disclosure.

FIG. 18 is a sequence diagram illustrating another example of downlink communication processing according to an embodiment of the present disclosure. Here, the description will be made for a case in which the first base station device 200A transmits a first transmission signal to the terminal device 400, and the second base station device 200B transmits a second transmission signal to the terminal device 400.

As illustrated in FIG. 18, the terminal device 400 notifies a first base station device 200A of a cell 20A to which the terminal device 400 itself is connected of information regarding the terminal capability of the terminal device 400 (Step S301). This information is the same as the information regarding the terminal capability described with reference to FIG. 17.

When it is determined to transmit a second transmission signal to the terminal device 400, the first base station device 200A requests the second base station device 200B to add a base station device (Step S302). The second base station device 200B transmits ACK/NACK in response to the request (Step S303). Here, it is assumed that the second base station device 200B sends ACK as a response.

The first base station device 200A notifies the terminal device 400 connected to the cell 20A managed by itself that the second base station device 200B has been added (Step S304). The terminal device 400 that has received the notification performs processing of initial connection to the second base station device 200B (Step S305).

Next, the first base station device 200A notifies the terminal device 400 connected to the cell 20A managed by the first base station device 200A of quasi-static control information related to the first FEC (Step S306). The quasi-static control information may also be notified to the second base station device 200B (Step S307). The quasi-static control information is the same as that described with reference to FIG. 17.

Receiving the quasi-static control information, the terminal device 400 and the second base station device 200B set the first FEC on the basis of the control information (Steps S308 and S309).

Note that, in a case where the terminal device 400 performs the second FEC, the quasi-static control information may include information related to the second FEC.

Thereafter, it is assumed that downlink communication occurs from the first base station device 200A to the terminal device 400. In this case, the first base station device 200A notifies the terminal device 400 of control information (dynamic control information) such as radio resources used for downlink communication from the first base station device 200A (Step S310). The dynamic control information is the same as that described with reference to FIG. 17.

Receiving the dynamic control information, the terminal device 400 performs settings for appropriately receiving downlink communication, including settings for the first FEC, on the basis of the control information (Step S311).

Note that, in a case where the terminal device 400 performs the second FEC, the dynamic control information may include information related to the second FEC (e.g., information regarding a second FEC coding method and a second FEC coding rate). Furthermore, the first base station device 200A may notify the second base station device 200B of the dynamic control information.

The first and second base station devices 200A and 200B perform encoding and modulation on downlink communication data to be transmitted to the terminal device 400 to match the control information notified to the terminal device 400. Here, the base station devices 200 perform encoding and modulation including the first FEC encoding (Steps S312 and S313) to generate a first transmission signal and a second transmission signal.

The first base station device 200A transmits a first transmission signal to the terminal device 400 as downlink communication (Step S314). The first transmission signal is the same as a signal obtained by performing encoding and modulation without applying the first FEC to the data sequence to be transmitted, and can be decoded without performing the first FEC decoding.

In addition, the second base station device 200B transmits a second transmission signal to the terminal device 400 as downlink communication (Step S221). The second transmission signal is a part of a signal obtained by performing encoding and modulation processing including the first FEC encoding on the data sequence to be transmitted, and is used for the first FEC decoding processing.

Receiving the first and second transmission signals, the terminal device 400 receives, demodulates, and decodes the received signals in a lower layer and an upper layer according to the settings specified in the control information. At this time, the terminal device 400 may decode the first and second transmission signals in a combined state or may decode the first and second transmission signals in a non-combined state.

In the example of FIG. 18, the terminal device 400 performs demodulation and decoding processing not including the first FEC decoding processing on the first transmission signal (Step S316). Next, the terminal device 400 determines whether or not the demodulation and decoding processing has been correctly performed (Step S317).

When the demodulation and decoding processing has been correctly performed (Yes in Step S317), that is, when the decoding of the data has succeeded, the process proceeds to Step S319.

When the demodulation and decoding processing has not been correctly performed (No in Step S317), that is, when the decoding of the data has failed, the terminal device 400 synthesizes the first transmission signal and the second transmission signal, and performs demodulation and decoding processing including the first FEC decoding (Step S318).

The terminal device 400 performs ARQ/HARQ processing depending on whether the decoding of the data has succeeded or failed (Step S319). Specifically, the first terminal device 400A sends ACK or NACK to the first and second base station devices 200A and 200B as a response depending on whether the decoding of the data has succeeded or failed (Steps S320 and S321). Note that the ARQ/HARQ processing performed here is the same as that in FIG. 17.

According to ACK/NACK received from the terminal device 400, the first and second base station devices 200A and 200B perform ARQ/HARQ processing (Steps S322 and S323). Note that the ARQ/HARQ processing performed here is the same as that in FIG. 17.

<4.3. Uplink Communication Processing>

Figure 19:
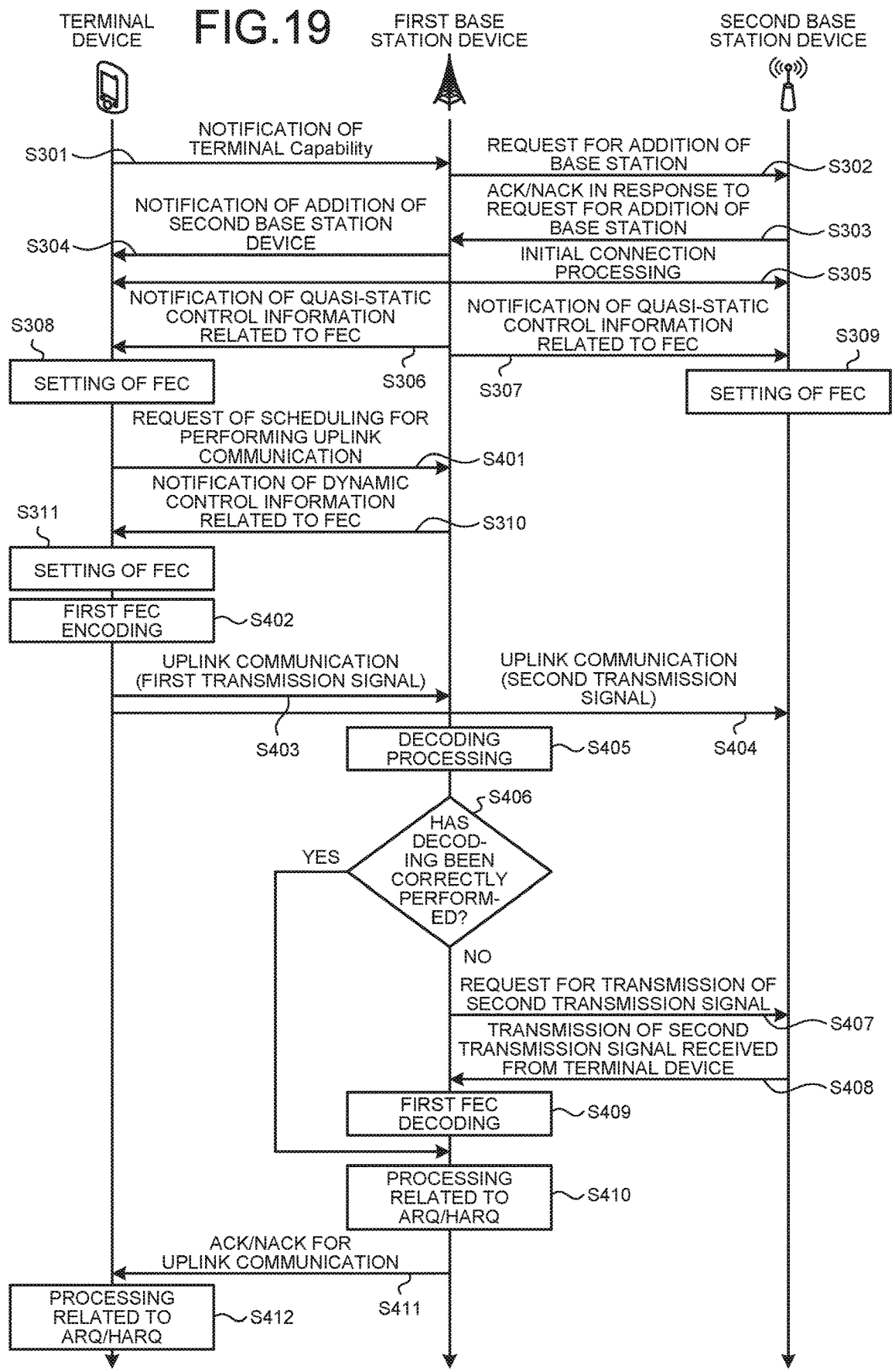
FIG. 19 is a sequence diagram illustrating an example of uplink communication processing according to an embodiment of the present disclosure.

FIG. 19 is a sequence diagram illustrating an example of uplink communication processing according to an embodiment of the present disclosure. In the uplink communication, the base station device 200 serves as a reception side (reception device), and the terminal device 400 serves as a transmission side (transmission device). In this case, it is preferable that the reception device (base station device 200) notifies the transmission device (terminal device 400) of whether there is a second transmission signal and a specific configuration parameter.

Here, the description will be made for a case in which the terminal device 400 transmits a first transmission signal to the first base station device 200A, and transmits a second transmission signal to the second base station device 200B. Note that steps S301 to S311 are the same as those in FIG. 18, and thus, the description thereof will be omitted.

As illustrated in FIG. 19, when uplink communication occurs from the terminal device 400 to the base station device 200, the terminal device 400 requests scheduling for performing the uplink communication (Step S401).

The terminal device 400 performs encoding and modulation on uplink communication data to be transmitted to the base station device 200 to match the control information received from the first base station device 200A. Here, the terminal device 400 performs encoding and modulation including the first FEC encoding (Step S402) to generate a first transmission signal and a second transmission signal.

The terminal device 400 transmits a first transmission signal to the first base station device 200A as uplink communication (Step S403). The first transmission signal is the same as a signal obtained by performing encoding and modulation without applying the first FEC to the data sequence to be transmitted, and can be decoded without performing the first FEC decoding.

In addition, the terminal device 400 transmits a second transmission signal to the second base station device 200B as uplink communication (Step S404). The second transmission signal is a part of a signal obtained by performing encoding and modulation processing including the first FEC encoding on the data sequence to be transmitted, and is used for the first FEC decoding processing.

Receiving the first transmission signal, the first base station device 200A performs demodulation and decoding processing not including the first FEC decoding processing on the first transmission signal (Step S405). Next, the first base station device 200A determines whether or not the demodulation and decoding processing has been correctly performed (Step S406).

When the demodulation and decoding processing has been correctly performed (Yes in Step S406), that is, when the decoding of the data has succeeded, the process proceeds to Step S410.

When the demodulation and decoding processing has not been correctly performed (No in Step S406), that is, when the decoding of the data has failed, the first base station device 200A requests the second base station device 200B to transmit a second transmission signal (Step S407). The second base station device 200B transmits a second transmission signal received from the terminal device 400 to the first base station device 200A in response to the request (Step S408).

Receiving the second transmission signal, the first base station device 200A synthesizes the first transmission signal and the second transmission signal, and performs demodulation and decoding processing including the first FEC decoding (Step S409).

The first base station device 200A performs ARQ/HARQ processing depending on whether the decoding of the data has succeeded or failed (Step S410). Specifically, the first base station device 200A sends ACK or NACK to the terminal device 400 as a response depending on whether the decoding of the data has succeeded or failed (Step S411). Note that the ARQ/HARQ processing performed here is the same as that in FIG. 17.

According to the ACK/NACK received from the first base station device 200A, the terminal device 400 performs ARQ/HARQ processing (Step S412). Note that the ARQ/HARQ processing performed here is the same as that in FIG. 17.

<4.4. Sidelink Communication Processing>

Figure 20:
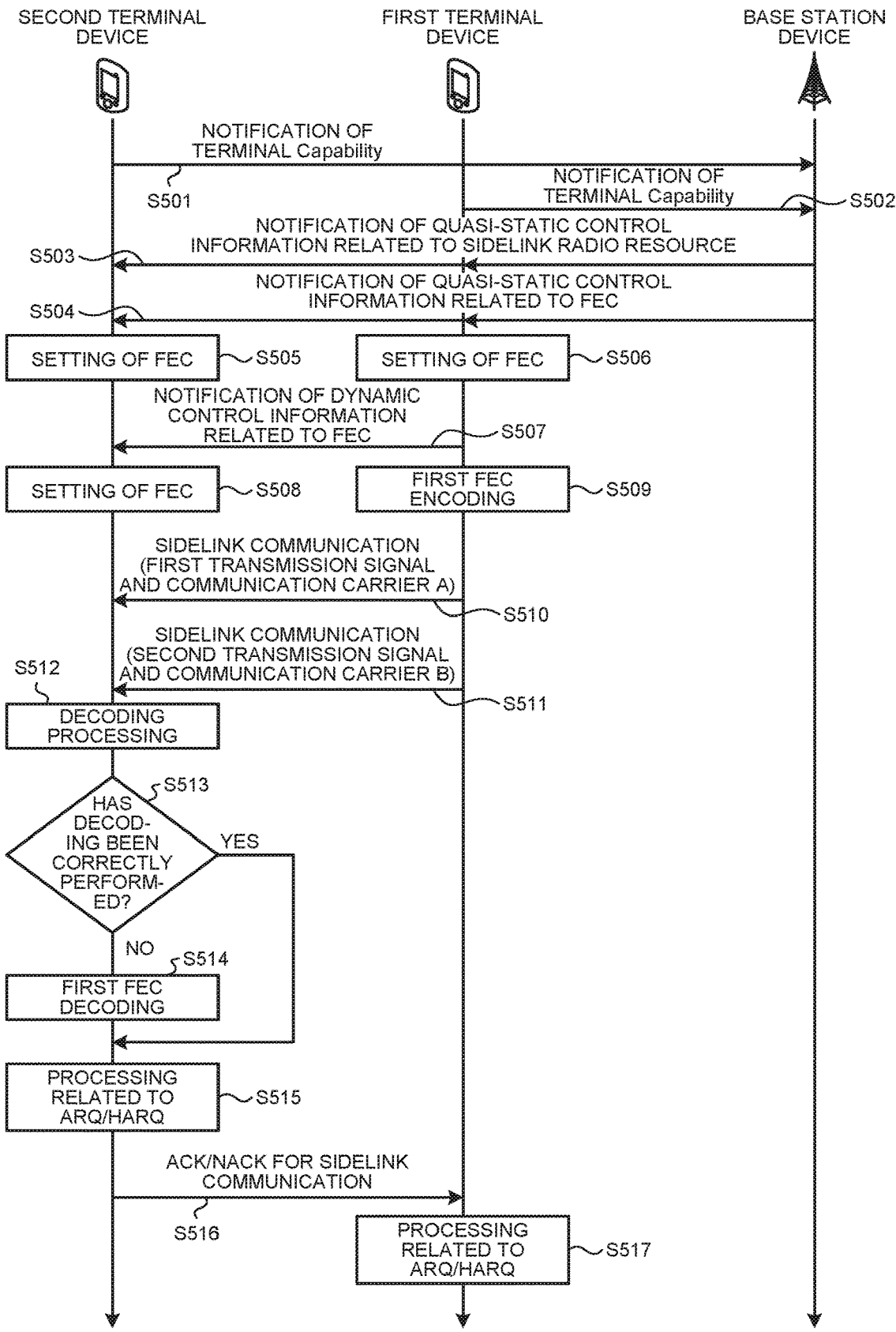
FIG. 20 is a sequence diagram illustrating an example of sidelink communication processing according to an embodiment of the present disclosure.

FIG. 20 is a sequence diagram illustrating an example of sidelink communication processing according to an embodiment of the present disclosure. In the sidelink communication, a first terminal device 400A serves as a transmission side (transmission device), and a second terminal device 400B serves as a reception side (reception device).

In the sidelink communication, it is preferable that the base station device 200 notifies the transmission device (first terminal device 400A) and the reception device (second terminal device 400B) of whether to transmit a second transmission signal and a specific configuration parameter.

In a case where there is no base station device 200, a terminal device serving as a transmission device (the first terminal device 400A in the following example) may have functions equivalent to those of the base station device 200. That is, the first terminal device 400A may notify the second terminal device 400B of whether to transmit a second transmission signal and a specific configuration parameter.

In FIG. 20, the description will be made for a case in which the first terminal device 400A transmits a first transmission signal using a communication carrier A and transmits a second transmission signal using a communication carrier B.

As illustrated in FIG. 20, the first terminal device 400A notifies a base station device 200 of a cell 20 to which the first terminal device 400A itself is connected of information regarding the terminal capability of the first terminal device 400A (Step S501). Similarly, the second terminal device 400B also notifies the base station device 200 of information regarding the terminal capability of the second terminal device 400B (Step S502). The information regarding the terminal capability is the same as that described with reference to FIG. 17.

The base station device 200 notifies the first and second terminal devices 400A and 400B connected to the cell 20 managed by the base station device 200 of quasi-static control information related to sidelink radio resources (Step S503). In addition, the base station device 200 notifies the first and second terminal devices 400A and 400B of quasi-static control information related to the first FEC (Step S504).

For the quasi-static control information related to sidelink radio resources, a frequency resource (e.g., a resource block, a subcarrier group, or a subcarrier) and a time resource (a radio frame, a subframe, a slot, a mini-slot, or a symbol) of a sidelink radio resource pool may be designated. The first and second terminal devices 400A and 400B may perform sidelink communication using radio resources within the range of the radio resource pool.

Concerning the radio resource pool, it is preferable to apply some of the uplink resources of the target cell 20 to the sidelink radio resource pool. Alternatively, some of the downlink resources of the target cell 20 may be applied to the sidelink radio resource pool.

The quasi-static control information related to first FEC and the quasi-static control information related to sidelink radio resources may be separately notified to the first and second terminal devices 400A and 400B, or may be simultaneously notified to the first and second terminal devices 400A and 400B.

The quasi-static control information may be cell-specific control information. The control information is notified during the initial access or after the initial access. In addition, the control information may be notified as a part of an RRC procedure, such as RRC signaling, RRC configuration, or RRC reconfiguration. In addition, the control information may be periodically notified from the base station device 200 to the first and second terminal devices 400A and 400B.

As a physical channel for notifying the control information, at least one of a physical broadcast channel (PBCH), a physical downlink control channel or an enhanced physical downlink control channel (EPDCCH), and a physical downlink shared channel is used.

Receiving the quasi-static control information, the first and second terminal devices 400A and 400B set the first FEC on the basis of the control information (Steps S505 and S506).

Thereafter, specifically, it is assumed that sidelink communication has occurred from the first terminal device 400A to the second terminal device 400B. For example, when direct communication between the first and second terminal devices 400A and 400B occurs or when a request for direct communication is received from the second terminal device 400B, sidelink communication occurs from the first terminal device 400A to the second terminal device 400B. In this case, the first terminal device 400A notifies the second terminal device 400B of control information (dynamic control information) such as radio resources used for sidelink communication (Step S507). Note that the dynamic control information is the same as the control information described with reference to FIGS. 17 to 19, except that the dynamic control information is transmitted by the first terminal device 400A.

Receiving the dynamic control information, the second terminal device 400B performs settings for appropriately receiving sidelink communication, including settings for the first FEC, on the basis of the control information (Step S508).

The first terminal device 400A performs encoding and modulation on sidelink communication data to be transmitted to the second terminal device 400B to match the control information notified to the second terminal device 400B. Here, the first terminal device 400A performs encoding and modulation including the first FEC (Step S509) to generate a first transmission signal and a second transmission signal.

The first terminal device 400A transmits the first transmission signal to the second terminal device 400B as sidelink communication using the communication carrier A (Step S510). The first transmission signal is the same as a signal obtained by performing encoding and modulation without applying the first FEC to the data sequence to be transmitted, and can be decoded without performing the first FEC decoding.

In addition, the first terminal device 400A transmits the second transmission signal to the second terminal device 400B as sidelink communication using the communication carrier B (Step S511). The second transmission signal is a part of a signal obtained by performing encoding and modulation processing including the first FEC encoding on the data sequence to be transmitted, and is used for the first FEC decoding processing.

Receiving the first and second transmission signals, the second terminal device 400B receives, demodulates, and decodes the received signals in a lower layer and an upper layer according to the settings specified in the control information. At this time, the second terminal device 400B may decode the first and second transmission signals in a combined state or may decode the first and second transmission signals in a non-combined state.

In the example of FIG. 20, the second terminal device 400B performs demodulation and decoding processing not including the first FEC decoding processing on the first transmission signal (Step S512). Next, the second terminal device 400B determines whether or not the demodulation and decoding processing has been correctly performed (Step S513).

When the demodulation and decoding processing has been correctly performed (Yes in Step S513), that is, when the decoding of the data has succeeded, the process proceeds to Step S515.

When the demodulation and decoding processing has not been correctly performed (No in Step S513), that is, when the decoding of the data has failed, the second terminal device 400B synthesizes the first transmission signal and the second transmission signal, and performs demodulation and decoding processing including the first FEC decoding (Step S514).

The second terminal device 400B performs ARQ/HARQ processing depending on whether the decoding of the data has succeeded or failed (Step S515). Specifically, the second terminal device 400B sends ACK or NACK to the first terminal device 400A as a response depending on whether the decoding of the data has succeeded or failed (Step S516). Note that the ARQ/HARQ processing performed here is the same as that in FIG. 17.

According to ACK/NACK received from the second terminal device 400B, the first terminal device 400A performs ARQ/HARQ processing (Step S517). Note that the ARQ/HARQ processing performed here is the same as that in FIG. 17.

Note that a case in which the transmission device does not perform the second FEC encoding has been described above as an example for the communication processing, but the present invention is not limited thereto. The transmission device may perform the second FEC encoding. In this case, the reception device performs second FEC decoding processing on a received signal. In addition, the transmission device may perform the second FEC encoding on the first bit sequence group BS1, and may not perform the second FEC encoding on the second bit sequence group BS2. In this way, the transmission device may perform the second FEC encoding on some of a plurality of bit sequences obtained by performing the first FEC encoding.

In addition, in the above-described embodiments, the second base station device 200B serving as a small cell base station device transmits or receives a second transmission signal, but the present invention is not limited thereto. The macro cell base station device 200A may transmit or receive a second transmission signal as a second base station device.

5. Supplement

Although the preferred embodiments of the present disclosure have been described in detail above with reference to the accompanying drawings, the technical scope of the present disclosure is not limited to such embodiments. It is obvious for a person having ordinary knowledge in the technical field of the present disclosure to conceive various changes or modifications within the scope of the technical idea set forth in the claims, and it should be understood that these changes or modifications also fall within the technical scope of the present disclosure.

Among the processes described in the above-described embodiments, all or some of the processes described as being automatically performed can be manually performed, or all or some of the processes described as being manually performed can be automatically performed by known methods. In addition, the processing procedures, the specific terms, and the information including various kinds of data and parameters described in the above documents and drawings can be arbitrarily changed unless otherwise specified. For example, the various kinds of information illustrated in each of the drawings are not limited to the illustrated information.

In addition, each component of each device illustrated in the drawings is functionally conceptual, and is not necessarily configured as illustrated in the drawings in physical term. That is, a specific form in which the devices are distributed or integrated is not limited to what is illustrated, and all or some of the devices can be configured in a form functionally or physically distributed or integrated in an arbitrary unit according to various loads, usage conditions, and the like.

In addition, the above-described embodiments can be appropriately combined unless any processing contradiction is caused.

Furthermore, the effects described in the present specification are merely illustrative or exemplary, and are not restrictive. That is, the technology according to the present disclosure can exhibit other effects obvious to those skilled in the art from the description of the present specification together with or instead of the above-described effects.

Note that the following configurations also fall within the technical scope of the present disclosure.

(1)
An information processing device comprising:
an encoding processing unit that performs error correction encoding processing in which a plurality of bit sequences are output from one or more bit sequences; and
a determination unit that divides the plurality of bit sequences into a first bit sequence group and a second bit sequence group, and determines to transmit the first bit sequence group and the second bit sequence group through different propagation paths, the first bit sequence group being decodable without performing error correction decoding processing corresponding to the error correction encoding processing, and the second bit sequence group being used for the error correction decoding processing.

(2)
The information processing device according to (1), wherein the determination unit determines to transmit the first bit sequence group and the second bit sequence group from different devices.

(3)
The information processing device according to (1) or (2), wherein the determination unit determines to transmit the first bit sequence group and the second bit sequence group through different communication carriers.

(4)
The information processing device according to any one of (1) to (3), wherein the determination unit determines to transmit the first bit sequence group and the second bit sequence group using different radio resources.

(5)
 The information processing device according to any one of (1) to (4), wherein the determination unit determines to transmit the first bit sequence group to a first communication counterpart and a second communication counterpart, and transmit the second bit sequence group to the second communication counterpart.

(6)
 The information processing device according to any one of (1) to (5), wherein the determination unit determines whether to transmit the second bit sequence group depending on quality of the propagation path through which the first bit sequence group is transmitted.

(7)
 The information processing device according to (6), wherein the determination unit determines whether to transmit the second bit sequence group depending on channel quality of the propagation path through which the first bit sequence group is transmitted.

(8)
 The information processing device according to (6), wherein the determination unit determines whether to transmit the second bit sequence group depending on a distance from a transmission device that transmits the first bit sequence group to a transmission counterpart.

(9)
 The information processing device according to any one of (1) to (8), further comprising a second encoding processing unit that performs second error correction encoding processing in which one bit sequence is output from one bit sequence,
 wherein, among a plurality of encoded bit sequences obtained by performing the second error correction encoding processing on the plurality of bit sequences respectively, the first bit sequence group includes the encoded bit sequence decodable without performing the error correction decoding processing, and
 among the plurality of encoded bit sequences, the second bit sequence group includes the encoded bit sequence to be used for the error correction decoding processing.

(10)
 An information processing device comprising:
 an encoding processing unit that performs error correction encoding processing in which a plurality of bit sequences are output from one or more bit sequences; and
 a transmission unit that divides the plurality of bit sequences into a first bit sequence group and a second bit sequence group, and transmits the first bit sequence group and the second bit sequence group through different propagation paths, the first bit sequence group being decodable without performing error correction decoding processing corresponding to the error correction encoding processing, and the second bit sequence group being used for the error correction decoding processing.

(11)
 An information processing device comprising:
 a reception unit that receives at least one of a first reception signal and a second reception signal transmitted through different propagation paths;
 a first decoding processing unit that demodulates the first reception signal to generate a reception data sequence;
 a second decoding processing unit that performs error correction decoding processing in which one bit sequence is output from a plurality of bit sequences using the first reception signal and the second reception signal to generate a reception data sequence; and
 a determination unit that determines which one of first decoding processing performed by the first decoding processing unit and second decoding processing performed by the second decoding processing unit is to be performed.

(12)
 A communication system comprising:
 a transmission device and a reception device,
 wherein the transmission device includes:
 an encoding processing unit that performs error correction encoding processing in which a plurality of bit sequences are output from one or more bit sequences; and
 a transmission unit that divides the plurality of bit sequences into a first bit sequence group and a second bit sequence group, and transmits a first transmission signal including the first bit sequence group and a second transmission signal including the second bit sequence group through different propagation paths, the first bit sequence group being decodable without performing error correction decoding processing corresponding to the error correction encoding processing, and the second bit sequence group being used for the error correction decoding processing, and
 wherein the reception device includes:
 a reception unit that receives at least one of the first transmission signal and the second transmission signal;
 a first decoding processing unit that demodulates the first transmission signal to generate a reception data sequence;
 a second decoding processing unit that performs the error correction decoding processing using the first transmission signal and the second transmission signal to generate a reception data sequence; and
 a determination unit that determines which one of first decoding processing performed by the first decoding processing unit and second decoding processing performed by the second decoding processing unit is to be performed.

(13)
 A communication system comprising:
 a first transmission device, a second transmission device, and a reception device,
 wherein the first transmission device includes:
 an encoding processing unit that performs error correction encoding processing in which a plurality of bit sequences are output from one or more bit sequences; and
 a transmission unit that divides the plurality of bit sequences into a first bit sequence group and a second bit sequence group, and transmits one of a first transmission signal including the first bit sequence group and a second transmission signal including the second bit sequence group, the first bit sequence group being decodable without performing error correction decoding processing corresponding to the error correction encoding processing, and the second bit sequence group being used for the error correction decoding processing, wherein the second transmission device includes:
a transmission unit that transmits the other one of the first transmission signal and the second transmission signal, and wherein the reception device includes:
a reception unit that receives at least one of the first transmission signal and the second transmission signal;
a first decoding processing unit that demodulates the first transmission signal to generate a reception data sequence;
a second decoding processing unit that performs the error correction decoding processing using the first transmission signal and the second transmission signal to generate a reception data sequence; and
a determination unit that determines which one of first decoding processing performed by the first decoding processing unit and second decoding processing performed by the second decoding processing unit is to be performed.

14. An information processing method comprising:
performing error correction encoding processing in which a plurality of bit sequences are output from one or more bit sequences; and
dividing the plurality of bit sequences into a first bit sequence group and a second bit sequence group, and determining to transmit the first bit sequence group and the second bit sequence group through different propagation paths, the first bit sequence group being decodable without performing error correction decoding processing corresponding to the error correction encoding processing, and the second bit sequence group being used for the error correction decoding processing.

15. An information processing method comprising:
performing error correction encoding processing in which a plurality of bit sequences are output from one or more bit sequences; and
dividing the plurality of bit sequences into a first bit sequence group and a second bit sequence group, and transmitting the first bit sequence group and the second bit sequence group through different propagation paths, the first bit sequence group being decodable without performing error correction decoding processing corresponding to the error correction encoding processing, and the second bit sequence group being used for the error correction decoding processing.

16. An information processing method comprising:
receiving at least one of a first reception signal and a second reception signal transmitted through different propagation paths; and
determining which one of first decoding processing and second decoding processing is to be performed, the first decoding processing generating a reception data sequence by demodulating the first reception signal, and the second decoding processing generating a reception data sequence by performing error correction decoding processing in which one bit sequence is output from a plurality of bit sequences using the first reception signal and the second reception signal.

REFERENCE SIGNS LIST 21, 41 SIGNAL PROCESSING UNIT
23, 45 CONTROL UNIT
200 BASE STATION DEVICE
211, 411 RECEPTION PROCESSING UNIT
212, 412 TRANSMISSION PROCESSING UNIT
211$b$, 211$d$ DECODING UNIT
212$b$, 212$d$ ENCODING UNIT
400 TERMINAL DEVICE

The invention claimed is:

1. An information processing device, comprising:
a first encoding processing unit configured to perform a first error correction encoding process in which a plurality of bit sequences is output; and
a determination unit configured to:
divide the plurality of bit sequences into a first bit sequence group and a second bit sequence group; and
determine that transmission of the first bit sequence group and the second bit sequence group are through different propagation paths, wherein
the second bit sequence group is transmitted based on a quality of a propagation path of the different propagation paths through which the first bit sequence group is transmitted, and
the first bit sequence group is decodable without a first error correction decoding process corresponding to the first error correction encoding process, and the second bit sequence group is for the first error correction decoding process.

2. The information processing device according to claim 1, wherein the determination unit is further configured to determine that the transmission of the first bit sequence group and the second bit sequence group are from different devices.

3. The information processing device according to claim 1, wherein the determination unit is further configured to determine that the transmission of the first bit sequence group and the second bit sequence group are through different communication carriers.

4. The information processing device according to claim 1, wherein the determination unit is further configured to determine that the transmission of the first bit sequence group and the second bit sequence group are based on different radio resources.

5. The information processing device according to claim 1, wherein the determination unit is further configured to determine the transmission of:
the first bit sequence group to a first communication counterpart and a second communication counterpart, and
the second bit sequence group to the second communication counterpart.

6. The information processing device according to claim 1, wherein the determination unit is further configured to determine the transmission of the second bit sequence group based on a channel quality of the propagation path through which the first bit sequence group is transmitted.

7. The information processing device according to claim 1, wherein the determination unit is further configured to determine the transmission of the second bit sequence group based on a distance from a transmission device that transmits the first bit sequence group to a transmission counterpart.

8. The information processing device according to claim 1, further comprising a second encoding processing unit configured to perform a second error correction encoding process in which one bit sequence is output, wherein
among a plurality of encoded bit sequences obtained by performing the second error correction encoding process on the plurality of bit sequences respectively, the first bit sequence group includes a first encoded bit sequence of the plurality of encoded bit sequences decodable without a second error correction decoding process, and
among the plurality of encoded bit sequences, the second bit sequence group includes a second encoded bit sequence of the plurality of encoded bit sequences for the second error correction decoding process.

9. An information processing device, comprising:
an encoding processing unit configured to perform an error correction encoding process in which a plurality of bit sequences is output; and
a transmission unit configured to:
divide the plurality of bit sequences into a first bit sequence group and a second bit sequence group; and
transmit the first bit sequence group and the second bit sequence group through different propagation paths, wherein
the second bit sequence group is transmitted based on a quality of a propagation path of the different propagation paths through which the first bit sequence group is transmitted, and
the first bit sequence group is decodable without an error correction decoding process corresponding to the error correction encoding process, and the second bit sequence group is for the error correction decoding process.

10. An information processing device, comprising:
a reception unit configured to receive at least one of a first reception signal or a second reception signal transmitted through different propagation paths, wherein the second reception signal is transmitted based on a quality of a propagation path of the different propagation paths through which the first reception signal is transmitted;
a first decoding processing unit configured to demodulate the first reception signal to generate a first reception data sequence;
a second decoding processing unit configured to perform error correction decoding process in which one bit sequence is output from a plurality of bit sequences based on the first reception signal and the second reception signal, to generate a second reception data sequence; and
a determination unit configured to determine which one of a first decoding process by the first decoding processing unit or a second decoding process by the second decoding processing unit is performed.

11. A communication system, comprising:
a transmission device; and
a reception device, wherein
the transmission device includes:
an encoding processing unit configured to perform an error correction encoding process in which a plurality of bit sequences is output from one or more bit sequences; and
a transmission unit configured to:
divide the plurality of bit sequences into a first bit sequence group and a second bit sequence group; and
transmit a first transmission signal including the first bit sequence group and a second transmission signal including the second bit sequence group through different propagation paths, wherein
the second bit sequence group is transmitted based on a quality of a propagation path of the different propagation paths through which the first bit sequence group is transmitted, and
the first bit sequence group is decodable without an error correction decoding process corresponding to the error correction encoding process, and the second bit sequence group is for the error correction decoding process, and
the reception device includes:
a reception unit configured to receive at least one of the first transmission signal or the second transmission signal;
a first decoding processing unit configured to demodulate the first transmission signal to generate a first reception data sequence;
a second decoding processing unit configured to perform the error correction decoding process based on the first transmission signal and the second transmission signal to generate a second reception data sequence; and
a determination unit configured to determine which one of a first decoding process by the first decoding processing unit or a second decoding process by the second decoding processing unit is performed.

12. A communication system, comprising:
a first transmission device;
a second transmission device; and
a reception device, wherein
the first transmission device includes:
an encoding processing unit configured to perform an error correction encoding process in which a plurality of bit sequences is output; and
a first transmission unit configured to:
divide the plurality of bit sequences into a first bit sequence group and a second bit sequence group; and
transmit one of a first transmission signal including the first bit sequence group or a second transmission signal including the second bit sequence group,
wherein the first bit sequence group is decodable without an error correction decoding process corresponding to the error correction encoding process, and the second bit sequence group is for the error correction decoding process,
the second transmission device includes
a second transmission unit configured to transmit other one of the first transmission signal or the second transmission signal, wherein the second transmission signal is transmitted based on quality of a propagation path through which the first transmission signal is transmitted, and the reception device includes:
- a reception unit configured to receive at least one of the first transmission signal or the second transmission signal;
- a first decoding processing unit configured to demodulate the first transmission signal to generate a first reception data sequence;
- a second decoding processing unit configured to perform the error correction decoding process based on the first transmission signal and the second transmission signal to generate a second reception data sequence; and
- a determination unit configured to determine which one of a first decoding process by the first decoding processing unit or a second decoding process by the second decoding processing unit is performed.

13. An information processing method, comprising:
performing error correction encoding processing in which a plurality of bit sequences is output;
dividing the plurality of bit sequences into a first bit sequence group and a second bit sequence group; and
determining that transmission of the first bit sequence group and the second bit sequence group are through different propagation paths, wherein
- the second bit sequence group is transmitted based on a quality of a propagation path of the different propagation paths through which the first bit sequence group is transmitted, and
- the first bit sequence group is decodable without performing error correction decoding processing corresponding to the error correction encoding processing, and the second bit sequence group is being used for the error correction decoding processing.

14. An information processing method, comprising:
performing error correction encoding processing in which a plurality of bit sequences is output;
dividing the plurality of bit sequences into a first bit sequence group and a second bit sequence group; and
transmitting the first bit sequence group and the second bit sequence group through different propagation paths, wherein
- the second bit sequence group is transmitted based on a quality of a propagation path of the different propagation paths through which the first bit sequence group is transmitted, and
- the first bit sequence group is decodable without performing error correction decoding processing corresponding to the error correction encoding processing, and the second bit sequence group is for the error correction decoding processing.

15. An information processing method, comprising:
receiving at least one of a first reception signal or a second reception signal transmitted through different propagation paths, wherein the second reception signal is transmitted based on a quality of a propagation path of the different propagation paths through which the first reception signal is transmitted;
determining which one of first decoding processing or second decoding processing is to be performed;
generating, based on the first decoding processing, a first reception data sequence by demodulating the first reception signal; and
generating, based on the second decoding processing, a second reception data sequence by performing error correction decoding processing in which one bit sequence is output from a plurality of bit sequences based on the first reception signal and the second reception signal.

* * * * *